(12) United States Patent
De Waal et al.

(10) Patent No.: US 12,370,542 B2
(45) Date of Patent: Jul. 29, 2025

(54) SYSTEM AND DEVICE

(71) Applicant: UNIVERSITY COLLEGE DUBLIN, NATIONAL UNIVERSITY OF IRELAND, DUBLIN, Dublin (IE)

(72) Inventors: Theo De Waal, Enfield (IE); Roohollah Ebrahimi, Kilkenny (IE); Michael Krivoruchko, Dublin (IE); Vladimir Lobaskin, Dublin (IE); Trish McOwan, Kilkenny (IE); William O'Connor, Dublin (IE); Dimitri Scholz, Leopardstown (IE)

(73) Assignee: UNIVERSITY COLLEGE DUBLIN, NATIONAL UNIVERSITY OF IRELAND, DUBLIN (IE)

( * ) Notice: Subject to any disclaimer, the term of this patent is extended or adjusted under 35 U.S.C. 154(b) by 831 days.

(21) Appl. No.: 16/613,018

(22) PCT Filed: May 11, 2018

(86) PCT No.: PCT/EP2018/062265
§ 371 (c)(1),
(2) Date: Nov. 12, 2019

(87) PCT Pub. No.: WO2018/206802
PCT Pub. Date: Nov. 15, 2018

(65) Prior Publication Data
US 2020/0197926 A1    Jun. 25, 2020

(30) Foreign Application Priority Data

May 12, 2017   (EP) .................................... 17170902

(51) Int. Cl.
*B01L 3/00*      (2006.01)
*G01N 15/14*    (2024.01)
(Continued)

(52) U.S. Cl.
CPC .......... *B01L 3/502* (2013.01); *G01N 15/1433* (2024.01); *G01N 15/1456* (2013.01);
(Continued)

(58) Field of Classification Search
CPC ............. B01L 3/502; B01L 2200/0684; B01L 2300/023; B01L 2300/0803;
(Continued)

(56) References Cited

U.S. PATENT DOCUMENTS

2003/0129756 A1* 7/2003 Thorne, IV ............... B01L 9/52
                                                              422/65
2008/0008628 A1* 1/2008 Park .................. B01L 3/502746
                                                             422/130
(Continued)

FOREIGN PATENT DOCUMENTS

EP      3020480 A1     5/2016
EP      3175921 A1 *  6/2017    .............. B01L 3/502
(Continued)

OTHER PUBLICATIONS

Giuseppe Cringoli et al, "FLOTAC: new multivalent techniques for qualitative and quantitative copromicroscopic diagnosis of parasites in animals and humans", Nature Protocols, vol. 5, No. 3, Feb. 25, 2010 (Feb. 25, 2010), p. 503-515, XP055419363 DOI: 10.1038/nprot.2009.235, ISSN:1754-2189.
(Continued)

*Primary Examiner* — Matthew D Krcha
*Assistant Examiner* — Sophia Y Lyle
(74) *Attorney, Agent, or Firm* — Clark Hill PLC; James R. Foley

(57) ABSTRACT

A cassette for use in concentrating matter in a sample suspension, the cassette comprising a housing having a support and an enclosed sample-receiving channel, the enclosed sample-receiving channel having an upper portion
(Continued)

and a base connected by at least two walls; in which the upper portion is configured to have a width less than a width of the base and a depth greater than 400 μm.

12 Claims, 12 Drawing Sheets

(51) Int. Cl.
*G01N 15/1433* (2024.01)
*G01N 15/01* (2024.01)

(52) U.S. Cl.
CPC . *B01L 2200/0684* (2013.01); *B01L 2300/023* (2013.01); *B01L 2300/0803* (2013.01); *B01L 2300/161* (2013.01); *B01L 2300/168* (2013.01); *B01L 2400/06* (2013.01); *G01N 2015/019* (2024.01); *G01N 2015/1486* (2013.01); *G01N 2015/1488* (2013.01)

(58) Field of Classification Search
CPC ......... B01L 2300/161; B01L 2300/168; B01L 2400/06; B01L 3/50273; B01L 3/502738; B01L 2300/0851; B01L 2300/0858; B01L 2400/0487; B01L 3/502715; B01L 2300/0877; G01N 15/1456; G01N 15/1463; G01N 2015/0088; G01N 2015/1486; G01N 2015/1488; G01N 21/7703; G01N 2021/7709; G01N 2021/7763; G01N 2021/7783; G01N 2201/064
See application file for complete search history.

(56) References Cited

U.S. PATENT DOCUMENTS

| | | |
|---|---|---|
| 2009/0170151 A1 | 7/2009 | Shaw |
| 2010/0285986 A1* | 11/2010 | Menges ........... G01N 33/54366 435/7.1 |
| 2014/0141464 A1* | 5/2014 | Zantl ................ B01L 3/502769 435/29 |
| 2016/0139110 A1* | 5/2016 | Zantl .................. G01N 33/5029 435/287.1 |
| 2016/0339434 A1 | 11/2016 | Toner et al. |
| 2017/0182494 A1* | 6/2017 | Perbost ................ B01L 3/5027 |

FOREIGN PATENT DOCUMENTS

| | | |
|---|---|---|
| JP | H0272860 A | 3/1990 |
| JP | 2006029824 A | 2/2006 |
| JP | 2007215472 A | 8/2007 |
| WO | 2015/156738 A1 | 10/2015 |

OTHER PUBLICATIONS

Giuseppe Cringoli et al, "FLOTAC: new multivalent techniques for qualitative and quantitative copromicroscopic diagnosis of parasites in animals and humans"; Nature Protocols; vol. 5, Issue 3; pp. 503-515; 2010.

Morgan, E.R. et al; "Effects of aggregation and sample size on composite faecal egg counts in sheep"; Veterinary Parasitology; vol. 131; pp. 79-87; 2005.

Rinaldi, L. et al; "Comparison of individual and pooled faecal samples in sheep for the assessment of 30 gastrointestinal strongyle infection intensity and anthelmintic drug efficacy using McMaster and Mini-FLOTAC"; Vet. Parasitol; vol. 205; pp. 216-223; 2014.

* cited by examiner

SYSTEM AND DEVICE

FIELD OF THE INVENTION

The invention relates to a system and device for qualitative and quantitative analysis of particulate matter within liquid samples by optical microscopy. In particular, the system and device relate to the measurement of biological elements, such as parasitic eggs, in a biological sample, such as a faecal sample.

BACKGROUND TO THE INVENTION

For a wide range of diagnostic purposes, in animal and human health and in environmental studies, the qualitative and quantitative analysis of particles in a given sample has a significant value. Qualitative refers to the confirmation of presence or absence of specific biological elements, while quantitative provides the number of these elements. The current standard method used in labs is the floatation technique where microscopy is used to detect, identify and quantify the particular biological material within the sample such as parasites in faecal matter, protozoa in water, and microorganisms in soil. The results from many of these tests have major environmental, financial and medical implications. The existing tests however are labour-intensive, time-consuming and require specially trained operators in suitably equipped laboratories.

Faecal egg count (FEC) tests are a valuable diagnostic tool and have a range of application. FEC is the detection of helminth eggs or parasitic oocysts. It is a floatation technique where a faecal sample is suspended in a solution with a specific gravity higher than that of the parasitic elements in question. The latter will float to the surface after a certain time delay, while heavier debris will sink. Microscopy is then used to detect, identify and quantify the eggs and oocysts within the sample.

This microscopical examination of animal faeces is important to enable judgement of the need for treatment. It provides an alternative to blind blanket treatment of food producing animals, which is the main driver of anthelmintic resistance in parasites (the ability of a worm to survive a drug treatment that would otherwise in the same conditions kill the parasite). Parasitic resistance is growing more rapidly than the development of new drugs, and indiscriminate treatment is accelerating the problem. There is an urgent need to address this. FEC's are important to determine the need for anthelmintic drug treatment and, if so, to determine which specific drug would be the most effective for the specific parasite. A further faecal egg count reduction test (FECRT) can be used to determine the efficacy of the chosen anthelmintic drug used in the treatment of infected animals.

Current FEC tests are generally carried out by a specialised laboratory. Faecal samples are tested for the presence of parasitic elements and results are generated in the form of eggs per gram of faeces (EPG). This evaluation involves a number of steps depending on the method used. All methods involve sample preparation in which a specific amount of faecal sample is homogenised with a suitable volume of flotation solution. The sample and solution quantities are chosen so that, among other considerations, the final FEC can be easily determined by multiplying the number of eggs counted under the marked areas by a simple conversion factor. The sample-in-solution may then be filtered and centrifuged before being transferred into a special container such as the most commonly used McMaster Slide or the mini-FLOTAC® device. The FLOTAC® device involves waiting 10 minutes or so and then rotating an upper disk with respect to the flotation chambers, before inserting the device into the microscope. This rotation process is called "translation", since it translates the top surface of the flotation chamber contents into a very shallow viewing area for analysis under the microscope.

Other centrifugal floatation techniques can evaluate larger volumes with high sensitivity by centrifuging the sample. However, they are not regularly used in laboratories due to the requirement of a centrifuge and the time needed to execute the technique, which is cost prohibitive for low cost routine FEC.

An alternative approach to FEC analysis involves the FECPAK$^{G2}$ apparatus that includes an image capturing device to be used in conjunction with a sample holder comprising a base and a projection extending from the base (the subject of U.S. Pat. No. 8,961,907 to SOWERBY). The base includes a contact region where, in use, the surface of a liquid sample may contact the projection. This device concentrates the eggs to the surface of the projected portion of the apparatus. This solution provides an on-site image capture of a faecal sample which is then transmitted to a lab for analysis.

These devices and methods for particle detection, identification, and analysis, exhibit a number of problems or disadvantages.

- The sensitivity of the test is proportional to the volume examined. The 0.3 ml examined under the McMaster slide gives a sensitivity of only 50 eggs per gram, while the 2 ml examined under the mini-FLOTAC® device gives an improved 5 eggs per gram sensitivity.
- The higher the volume examined, the greater the surface area that needs to be analysed. Under the microscope, the visible surface area, or Field of View (FOV), is limited at any single instant. The larger the magnification, the smaller the field of view. This poses a major obstacle for efficient examination or scanning of the entire surface area. Such scanning of the entire surface is time consuming, adding to the cost of the analysis. It also poses a problem for any automated recognition system due to the high number of individual images required to scan the entire surface properly and completely.
- There are constraints on the relationship between the volume of the fluid sample and the surface area. Increased volume, and therefore sensitivity, results in increased surface area to be examined. Digital identification of the objects of interest may not be viable because of the number of images required to cover each field of view, which prevents onsite identification by untrained operators.
- The mechanical design of such existing devices is not very suitable for incorporation into an automated process or for use by untrained personnel. The McMaster is on open system and if not handled carefully leads to sample leakage. The mini FLOTAC® requires rotation of the lid after the required flotation period, which involves human intervention during the process and some specialised knowledge and skill.

While the FECPAK$^{G2}$ apparatus addresses the concentration requirement of the sample, the system also has its shortcomings.

- By concentrating the particles to one FOV, the apparatus may over-concentrate the samples in question, which causes overlapping of eggs and debris seen in the microscope. This may lead to significant miscounts, especially if the counting uses image recognition software.

The present application of this apparatus is for the remote image capture of the sample, but the analysis of the image is still carried out by trained laboratory staff. There is no evidence that the image is suitable for automated object recognition.

The concentration of particles in this device involves a layering or accumulation of eggs into one field of view but this will limit the capacity to identify smaller species such as Coccidia as they may be obscured by larger species.

As this apparatus is not closed, there is a risk that a tilting of the cassette prior to insertion in the device may lead to a lower meniscus level which will be out of focus for a fixed-focus image capturing device.

The open cassette may also be subject to evaporation which would lower the level of the meniscus formed after the floatation period of 2 to 5 minutes. This could also lead to an out of focus image if a camera or sensor has a fixed focus mechanism.

To identify and count items at or below 50 µm of the top surface of the fluid channel, the microscope optics need high magnification and resolution, resulting in a smaller depth of focus. This in turn makes it more difficult to achieve accurate and reliable counting.

This depth of focus problem may be reduced with lower magnifications but this would in turn limit the potential identification of smaller species.

U.S. patent application Ser. No. 13/387,076 (US Publication No. 20120135457A) discloses a method for analysing parasitic eggs or other particles in a faecal sample by using a device comprising a holder with a projection. The projection comprises a distal end that is tapered, and which includes a fluid cavity with chamfered, sloping walls. Light is transmitted through the base of the projection. The device can be used with an image capturing device/microscope to determine the presence of eggs. The problems associated with this device are:

1. Poor Image Quality leading to poor automated results and loss of accuracy.

Due to different y-plane locations of the sample for observations, as the container holding the sample to be examined is open, the magnified objects of interest are not confined to the same plane. Some will rise up on the meniscus while some may stay in solution. This will lead to different fields of focus within the one image which would result in loss of contrast for recognition.

As this apparatus is not closed, there is a risk that a tilting of the cassette prior to insertion in the device may lead to a lower meniscus level which will be out of focus for a fixed focus image capturing device.

This cassette is open and, as such, may be subject to evaporation which would also lower the level of the meniscus formed after the floatation period of 2 to 5 minutes. This could also lead to an out of focus image and having species for observation at different planes.

By concentrating the particles to one FOV, the apparatus may over-concentrate the samples in question, which causes overlapping of eggs, debris and solved air bubbles. This may result in issues with any potential image recognition software.

The concentration of particles in this device involves a layering or accumulation of eggs into one field of view but this could limit the identification of smaller species such as Coccidia as they may be obscured by large species masking them.

Higher magnification and resolution factors of a lens apparatus required for smaller species of sub 50 µm size result in a smaller depth of focus for an image capturing device.

2. Sensitivity of Test

The sensitivity of the test is directly proportional to the volume of the sample.

Although the size of the container is not limited, the requirement for centrifuging the sample for a container holding over a depth of 3 mm has been observed (in order to remove the debris for subjects of interest and maintain image clarity under microscopy) and this would limit the volume in each cavity to a very small value. Multiple cavities could be used but would require precision x and/or y movement which will add to the expense of the device.

JP 2006 029824 uses a device having a sample channel that is no more than 400 µm in depth for determining the presence of matter in a sample suspension. The depth of the channel makes it unsuitable for sufficiently high volume to be representative and the observations are made in the flow path of the channel.

JP H02 72860 uses a laser to detect cells in a channel that is adapted to accommodate a sample of cells in solution.

WO 2015/156738 describes a microfluidic-based Polymerase Chain Reaction (PCR) device having a plurality of wells that are arranged in a radial symmetrical pattern, where the wells are filled via a common fluid channel. When a product of interest is made during PCR, the system containing this device detects a signal emitted by the generated product.

US 2016/339434 describes a device for focusing particles in microchannel using inertia-elastic methods. The particles are driven through a channel and form a localised path line in a viscoelastic fluid at or near the centre of the channel. High flow rates are required and the viscoelastic material must have a dynamic viscosity that varies with the shear rate.

EP3020480 describes a cell culture device for growing cells on a hydrogel matrix, where the matrix is held in a channel separating two chambers designed to accommodate cell culture media for feeding the cells of interest.

US 2009/170151 describes a flow-through cell comprising substrate having a channel, an inlet and outlet and a portion of the substrate being light-permeable to allow particles within the channel to be detected. The cell requires capillary action to function.

It is an object of the present invention to overcome at least one of the above-mentioned problems.

SUMMARY OF THE INVENTION

The invention relates to a cassette designed to hold a specific volume of a liquid sample (or sample suspension) in a manner which facilitates the concentration of and accurate identification and counting of target (particulate) matter floating to the surface from within the sample. The liquid sample is contained in an enclosed sample-receiving channel with a shaped (either trapezius or equivalent with a narrower top and broader base or rectangular) cross-section. The inner walls of the enclosed sample-receiving channel can be coated with a hydrophobic or hydrophilic material to reduce surface tension along the side walls of the channel to prevent adhesion of particulate matter. The liquid sample is made up of a portion of the sample for observation and a floatation solution of higher density than the particles of interest. A vibration may be applied over a short period of time while the flotation process is in progress. The suspended particles in the liquid sample float to the top surface of the enclosed sample-receiving channel for observation under the microscope.

To facilitate scanning of the closed sample-receiving channel surface, it is convenient to make the width of the enclosed sample-receiving channel to correspond approximately to the width of the field of view of the chosen microscope optics, so that the scanning process then involves only one component of relative motion between the channel and microscope optics. The scanning of the entire surface then consists of incremental relative motion, for example, moving the cassette so that the microscope optics see, incrementally, the entire (or almost entire) upper surface of the enclosed sample-receiving channel. Alternatively, to achieve the scanning, the enclosed sample-receiving channel could remain stationary and the optics moved, or any combination of the two motions, such that relative motion is achieved. The system can thus be automated and allows the user to collate accurate data from a wider number of samples far more quickly and without specialised operator skills.

According to the invention, there is provided, as set out in the appended claims, a cassette (1,200,300) for use in determining the presence of matter in a sample suspension, the cassette (1,200,300) comprising a housing (2) having a support (5); an inlet channel (20) adapted to receive the sample suspension; and a closed sample-receiving channel (6) in fluid communication with the inlet channel (20), the closed sample-receiving channel (6) having an upper portion (7,208) and a base (5a) connected by at least two walls (11a,11b) forming a long axis; in which the upper portion (7,208) is configured to have a width equal to or less than a width of the base (5a).

According to the invention, there is provided, as set out in the appended claims, a cassette (1,200,300) for use in concentrating (particulate) matter in a sample suspension, the cassette (1,200,300) comprising a housing (2) having a support (5) and an enclosed sample-receiving channel (6), the enclosed sample-receiving channel (6) having an upper portion (7,208) and a base (5a) connected by at least two walls (11a,11b); in which the upper portion (7,208) is configured to have a width less than a width of the base (5a).

According to the invention, there is provided, as set out in the appended claims, a cassette (1,200,300) for use in concentrating (particulate or suspended) matter in a sample suspension, the cassette (1,200,300) comprising a housing (2) having a support (5) and an enclosed sample-receiving channel (6), the enclosed sample-receiving channel (6) having an upper portion (7,208) and a base (5a) connected by at least two walls (11a,11b); in which the upper portion (7,208) is configured to have a width less than a width of the base (5a) and a depth greater than about 400 µm.

Preferably, the upper portion is configured to have a width less than the width of the base and a depth greater than about 300 µm, but less than about 3000 µm, when measured from the top of the raised platform (50), that is, between about 300 µm and about 3000 µm. Preferably, the depth is between about 300, 301, 302, 303, 304, 305, 306, 307, 308, 309, 310, 315, 320, 325, 330, 335, 340, 345, 350, 355, 360, 365, 370, 375, 380, 385, 390, 395, 400, 401, 402, 403, 404, 405, 406, 407, 408, 409, 410, 415, 420, 425, 430, 435, 440, 445, 450, 455, 460, 465, 470, 475, 480, 485, 490, 495, 500, 505, 510, 515, 520, 525, 530, 535, 540, 545, 550, 555, 560, 565, 570, 575, 580, 585, 590, 595, 600, 605, 610, 615, 620, 625, 630, 635, 640, 645, 650, 655, 660, 665, 670, 675, 680, 685, 690, 695, 700, 705, 710, 715, 720, 725, 730, 735, 740, 745, 750, 755, 760, 765, 770, 775, 780, 785, 790, 795, 800, 805, 810, 815, 820, 825, 830, 835, 840, 845, 850, 855, 860, 865, 870, 875, 880, 885, 890, 895, 900, 905, 910, 915, 920, 925, 930, 935, 940, 945, 950, 955, 960, 965, 970, 975, 980, 985, 990, 995, 1000, 1005, 1010, 1015, 1020, 1025, 1030, 1035, 1040, 1045, 1050, 1055, 1060, 1065, 1070, 1075, 1080, 1085, 1090, 1095, 1100, 1105, 1110, 1115, 1120, 1125, 1130, 1135, 1140, 1145, 1150, 1155, 1160, 1165, 1170, 1175, 1180, 1185, 1190, 1195, 1200, 1205, 1210, 1215, 1220, 1225, 1230, 1235, 1240, 1245, 1250, 1255, 1260, 1265, 1270, 1275, 1280, 1285, 1290, 1295, 1300, 1305, 1310, 1315, 1320, 1325, 1330, 1335, 1340, 1345, 1350, 1355, 1360, 1365, 1370, 1375, 1380, 1385, 1390, 1395, 1400, 1405, 1410, 1415, 1420, 1425, 1430, 1435, 1440, 1445, 1450, 1455, 1460, 1465, 1470, 1475, 1480, 1485, 1490, 1495, 1500, 1505, 1510, 1515, 1520, 1525, 1530, 1535, 1540, 1545, 1550, 1555, 1560, 1565, 1570, 1575, 1580, 1585, 1590, 1595, 1600, 1605, 1610, 1615, 1620, 1625, 1630, 1635, 1640, 1645, 1650, 1655, 1660, 1665, 1670, 1675, 1680, 1685, 1690, 1695, 1700, 1705, 1710, 1715, 1720, 1725, 1730, 1735, 1740, 1745, 1750, 1755, 1760, 1765, 1770, 1775, 1780, 1785, 1790, 1795, 1800, 1805, 1810, 1815, 1820, 1825, 1830, 1835, 1840, 1845, 1850, 1855, 1860, 1865, 1870, 1875, 1880, 1885, 1890, 1895, 1900, 1905, 1910, 1915, 1920, 1925, 1930, 1935, 1940, 1945, 1950, 1955, 1960, 1965, 1970, 1975, 1980, 1985, 1990, 1995, 2000, 2005, 2010, 2015, 2020, 2025, 2030, 2035, 2040, 2045, 2050, 2055, 2060, 2065, 2070, 2075, 2080, 2085, 2090, 2095, 2100, 2105, 2110, 2115, 2120, 2125, 2130, 2135, 2140, 2145, 2150, 2155, 2160, 2165, 2170, 2175, 2180, 2185, 2190, 2195, 2200, 2205, 2210, 2215, 2220, 2225, 2230, 2235, 2240, 2245, 2250, 2255, 2260, 2265, 2270, 2275, 2280, 2285, 2290, 2295, 2300, 2305, 2310, 2315, 2320, 2325, 2330, 2335, 2340, 2345, 2350, 2355, 2360, 2365, 2370, 2375, 2380, 2385, 2390, 2395, 2400, 2405, 2410, 2415, 2420, 2425, 2430, 2435, 2440, 2445, 2450, 2455, 2460, 2465, 2470, 2475, 2480, 2485, 2490, 2495, 2500, 2505, 2510, 2515, 2520, 2525, 2530, 2535, 2540, 2545, 2550, 2555, 2560, 2565, 2570, 2575, 2580, 2585, 2590, 2595, 2600, 2605, 2610, 2615, 2620, 2625, 2630, 2635, 2640, 2645, 2650, 2655, 2660, 2665, 2670, 2675, 2680, 2685, 2690, 2695, 2700, 2705, 2710, 2715, 2720, 2725, 2730, 2735, 2740, 2745, 2750, 2755, 2760, 2765, 2770, 2775, 2780, 2785, 2790, 2795, 2800, 2805, 2810, 2815, 2820, 2825, 2830, 2835, 2840, 2845, 2850, 2855, 2860, 2865, 2870, 2875, 2880, 2885, 2890, 2895, 2900, 2905, 2910, 2915, 2920, 2925, 2930, 2935, 2940, 2945, 2950, 2955, 2960, 2965, 2970, 2975, 2980, 2985, 2990, 2995 and 3000 µm. More preferably, the depth is greater than about 350 µm but less than about 3000 µm; even more preferably, the depth is greater than about 375 µm but less than 3000 µm; ideally, the depth is greater than about 400 µm but less than about 3000 µm, when measured from the top of the raised platform (50).

Preferably, the walls (11a,11b) of the enclosed sample-receiving channel (6) are straight, they have a slope of between 40° and 90° with respect to the base (5a).

Preferably, the upper portion (7,208) is configured to have a width less than the width of the base (5a).

Preferably, the base (5a) is formed by the housing support (5).

Preferably, the enclosed sample-receiving channel (6) further comprises a raised platform (50) extending upwards from the base (5a). Ideally, the raised platform (50) is separated from the upper portion (7,208) and one or both of the walls (11a,11b). By that, it is understood that the platform (50) is not connected to one or both of the walls (11a,11b) or the upper portion (7,208), leaving a space (a void) around at least one side of the platform (50) for the liquid sample to fill and the suspended particles to rise.

Preferably, the enclosed sample-receiving channel (6) can have any shape selected from the group comprising straight, curved, circular, partial circle, elliptical, a connected series of two or more straight or curved lines, or a combination thereof.

Preferably, the enclosed sample-receiving channel (6) in cross-section is a trapezoid, an isosceles trapezoid, a truncated triangle, a rectangle, an isosceles trapezoid on a rectangle, an ellipse, an arc, is concave or convex.

Preferably, the cassette further comprises an inlet port (20) adapted to receive the sample suspension and act as a conduit to deliver the sample to the enclosed sample-receiving channel.

Preferably, the housing (2) further comprises an air release port (14) in fluid communication with the enclosed sample-receiving channel (6). Ideally, the outlet port (14) is diametrically opposed the inlet port (20). Alternatively, or both, the air release port (14) is opposite the inlet port (20).

Preferably, the inlet port (20) is a non-return valve.

Preferably, the housing (2) of the cassette (1) is either open or closed.

Preferably, the housing (2) of the cassette (1) is a single piece.

Preferably, the housing (2) of the cassette (1) consists of a lower section (201) configured to accommodate the enclosed sample-receiving channel (6) and an upper section (202) configured to reversibly attach to and create a seal with the lower section (201). Ideally, the enclosed sample-receiving channel (6) is formed on the lower section (201). More preferably, the enclosed sample-receiving channel (6) is formed when the lower section (201) and the upper section (202) are combined and form a closed, sealed housing (2).

Preferably, the housing (2) is substantially circular, linear, a triangle, a quadrangle. Ideally, when the housing (2) is substantially a circle, the enclosed sample-receiving channel (6) is circular. Preferably, the housing further comprises a hole (30) configured to receive an actuator (101) connected to an image capturing device (100).

Preferably, the housing (2) is linear, the enclosed sample-receiving channel (6) is linear and the housing (2) moves along its long axis. The housing (2) and enclosed sample-receiving channel (6) may be rectilinear or curvilinear.

Preferably, the cassette (1,200,300) is configured to move in one plane. Alternatively, or alternately, when the cassette (1,200,300) is stationary, an image capturing device (100) is configured to move in one plane.

Preferably, the motion within the plane can be rectilinear-translation or rotation, or a combination thereof.

Preferably, an internal surface of the walls (11a,11b) of the enclosed sample-receiving channel (6) is coated with a hydrophobic material.

Preferably, an internal surface of the walls (11a,11b) of the enclosed sample-receiving channel (6) is coated with a hydrophilic material.

Preferably, the housing (2) is transparent or translucent.

Preferably, the cassette (1,200,300) is disposable or suitable for re-use.

Preferably, the matter is suspended matter or particulate matter.

There is provided, as set out in the appended claims, a method for determining the presence of particulate matter in a sample suspension, the method comprising the steps of:
preparing the sample suspension;
mixing the sample suspension thoroughly in a container;
introducing the thoroughly mixed sample suspension into the enclosed sample-receiving channel (6) of the cassette (1,200,300) as described above;
mounting the cassette (1,200,300) with the mixed sample suspension onto an image capturing device (100) having an objective lens (102); and
moving the cassette (1,200,300) or optical image device (100) in one plane to allow the determination of the presence of particulate matter in the sample suspension, wherein the field of view of the objective lens (102) corresponds to the width of an upper portion (7,208) of the enclosed sample-receiving channel (6).

Preferably, the image capturing device (100) comprises an actuator (101) configured to engage with the cassette (1,200,300) and move either the objective lens (102) or the cassette (1,200,300) in one plane only.

There is provided, set out in the appended claims, a system (400) for determining the presence of particulate matter in a sample suspension, the system comprising the cassette (1,200,300) as described above and an image capturing device (100) configured to accommodate the cassette (1,200,300).

Preferably, the system further comprises a computer, an internal storage device, a detector (122) and wireless network to send data for cloud-computing storage.

There is provided, as set out in the appended claims, a kit for determining the presence of particulate matter in a liquid sample, the kit comprising a cassette (1,200,300) as describe above and a flotation solution.

Preferably, the flotation solution is selected from a saturated NaCl solution with specific gravity of 1.20, a saturated sugar solution with a specific gravity of 1.280, a Sheather's sugar solution with a specific gravity of 1.20, a saturated zinc sulphate solution with a specific gravity of 1.20, a saturated sodium nitrate solution with a specific gravity of 1.20, and a saturated magnesium sulphate solution with a specific gravity of 1.280.

In the specification, the term "cassette" should be understood to mean a body or housing adapted to receive and contain a specific volume of a liquid sample. The cassette is configured for use in an image capturing device for analysis of particulate matter in the liquid sample. The liquid sample is contained in a closed channel accommodated within the cassette.

In the specification, the term "liquid sample" should be understood to mean a sample obtained from a liquid source, for example, blood, sputum, liquid faeces, urine, cerebrospinal fluid, saliva, synovial fluid, water (from a stream, a river, a sea, an ocean), treated water waste, untreated water waste, biological waste run off, agricultural land run off, or solid matter such as soil or solid faeces which is suspended in a suitable flotation solution, etc. When a solid matter is suspended in a suitable flotation solution, the liquid sample is also generally known as a "sample suspension".

In the specification, the term "matter", wherein it relates to the liquid sample being tested or analysed, should be understood to mean any particulate or suspended matter that is of interest in the liquid sample and distinguishable from the suspending liquid. Such matter can be eggs or oocysts from a parasite, fungal spores, pollen, seeds, microscopic artefacts/insects, bone fragments, minerals, plastics (e.g. micro-beads), or other artefacts recovered from screening soils obtained from archaeological sites or to recover minerals from soil and/or water.

In the specification, the term "image capturing device" should be understood to mean a device capable of capturing an image of the sample in the cassette when being scanned, such as, for example, a microscope with a magnifying lens, a digital optical sensor array, a camera (such as an analog or digital single lens reflex (SLR) camera, a video camera, a movie camera) capable of obtaining a single image or multiple images and coupled to a computer equipped with software which allows for fully automated imaging, a camera device within another device (such as a mobile telephone) with or without a separate magnifying lens or other optical magnification device or detachable lens, or a system capable of transferring the image elsewhere before capture, or capable of displaying it on a screen before capture. The single digital image may cover the full width of the channel but usually only a portion of its length. Therefore, the step of capturing the image is usually followed by the step of movement of the cassette or optical device, which can be automated. These steps of capture/movement cycles are repeated until the full cassette is imaged and ready for analysis. The scanning process can also be achieved by holding the cassette stationary and moving the microscope optics, or optionally a combination of the two motions. Any method of achieving the desired relative motion between sample container and microscope optics is suitable for use with the invention.

The image is projected from the lens directly onto the image sensor. The control board commands image capture and storage onto the device. The image can be partially or fully processed locally on the device and uploaded to the cloud (a network of remote servers hosted on the Internet to store, manage, and process data, rather than a local server or a personal computer) or uploaded without any pre-processing or with some pre-processing prior to uploading. This analysis will involve the processing of the image for detecting the presence of specific particles of interested against certain criteria and a qualitative and qualitative result will be obtained. This result will be stored and a copy forwarded to the end user.

In the specification, the term "enclosed sample-receiving channel" should be understood to mean an enclosed channel with a particular shape in cross-section, with walls at an angle of between 40° and 90°, preferably between 40° and less than 90°, to concentrate the floating particulate matter in a sample as it rises to the upper surface of the channel. The walls of the enclosed sample-receiving channel can be straight, curved, circular, partial circle, elliptical.

In the specification, the term "trapezius cross-section enclosed sample-receiving channel" should be understood to mean an enclosed channel having a trapezoid shape in cross-section, with side walls at an angle of between 40° and less than 90° to concentrate the floating particulate matter in a sample as it rises to the upper surface. The term "rectangular" cross-section closed channel should be understood to mean an enclosed channel having a 90° angle between the side wall and the base. The slope (angle) of the side walls of the channel benefits from being sufficiently angled to concentrate the particles into the small surface area at the top, but not so sloped so as to encourage adhesion of particles making their way to the top. The enclosed sample-receiving channel is generally closed on top by, for example, a transparent lid, a transparent upper surface window or a transparent ceiling through which the image is captured. To facilitate lighting from below, the bottom of the enclosed sample-receiving channel, including any raised portion thereof, should be at least translucent, or optionally transparent, so that light can enter the enclosed sample-receiving channel from below to reach the transparent lid/transparent upper surface window/transparent ceiling. The depth of the closed sample-receiving channel is limited to facilitate flotation of target particles through the fluid to the upper surface (debris and extraneous matter in the sample can inhibit the flotation process excessively if the depth is too great), to facilitate travel of partially buoyant particles to the top surface, to avoid excess accumulated debris from the lower layers beneath the top surface obstructing the light and reducing contrast in the images captured. The length of the enclosed sample-receiving channel is then set so that the total volume of the enclosed sample-receiving channel (cross sectional area by length) is sufficient to be representative of the sample content. This long axis ("length" axis) of the enclosed sample-receiving channel can follow any convenient path. It can be in a straight line, in which case the relative motion of the cassette and optics will be a linear translation. It may be advantageous to make the longer dimension of the enclosed sample-receiving channel to be circular, forming a partial or complete ring shape. In one embodiment of the cassette considered below, the long dimension of the enclosed sample-receiving channel forms a complete circle, located near the perimeter of a disc, which is held horizontally when being scanned. The microscope optics are then held stationary above the enclosed sample-receiving channel directed downwards and perpendicular to a surface upon which rests the optics. In this way, the scanning process can be achieved by a simple rotation of the disk such that the microscope optics will scan the entire (or almost the entire) enclosed sample-receiving channel as the disk rotates through all or most of 360°. Alternatively, the optics can rotate and scan the entire channel as the disk rotates through approximately 360°.

The total volume of the enclosed sample-receiving channel needs to be sufficient to contain a representative liquid sample which could include sufficient particles to obtain an accurate measure.

The enclosed sample-receiving channel may also include a platform rising upwards from the base of the channel. However, the platform is never flush with the side walls of the channel.

In the specification, the term "hydrophobic material" should be understood to mean any thin coating of polymer or other material on the order of nanometres to the nanoscopic surface layer on the internal walls of the channel of the cassette described above, which inhibits the attachment of biomolecules, protein, eggs, or other target material suspended within the sample solution. Examples of hydrophobic material are, but not limited to, silicon- or fluorine-based polymers like such as tetrafluoroethylene, or polydimethylsiloxane (PDMS), alkanes, oils, functionalized nanoparticles, nanotextured silica, nanotextured fluorinated polymer, polymers with nano-texture, etc.

In the specification, the term "hydrophilic material" should be understood to mean any thin coating of polymer or other material on the order of nanometres to the nanoscopic surface layer on the internal walls of the channel of the cassette described above, which inhibits the attachment of biomolecules, protein, eggs, or other target material suspended within the sample solution. Examples of such hydrophilic materials are, but not limited to, proteins, cellulose, polyethylene glycol ethers, polyamides, polyacrylic amides, polyurethanes with polyethylene glycol ether soft segments, ethoxylated graft polymers, etc.

In the specification, the terms "outlet channel" or "air release port", said terms being used interchangeably, should be understood to mean an outlet port arranged so that when a liquid sample is introduced into the enclosed sample-receiving channel via an inlet port, the air release port allows air previously occupying the enclosed sample-receiving channel to escape and be replaced by the incoming liquid. The air release port prevents liquid in the enclosed sample-receiving channel from escaping either by a vacuum seal, or in combination with an inlet port (which may act as a non-return valve) or a control valve. This retention will occur despite the subsequent movement of the cassette in the optical device.

In the specification, the term "inlet port", when in relation to receiving a sample, should be understood to mean an inlet port that normally allows fluid (liquid or gas) to flow through it in only one direction and prevents fluid from flowing back out. It prevents backflow of fluids. When used in combination with the air release port, a liquid sample can be introduced to the enclosed sample-receiving channel without the risk of air bubbles being introduced therein, which could interfere with or confuse the analysis of the sample. The inlet port acts, in some way, like a non-return valve.

In the specification, the term "one plane" should be understood to mean movement of the cassette or optical device along a horizontal plane of the axis, wherein the axis of movement can be straight, circular, zig-zag, up-and-down, but always in a horizontal plane. The movement then is such that either the enclosed sample channel of the cassette and the cassette itself stay in a horizontal plane, or the optical device moves in a horizontal plane to scan the channel. The plane, therefore, is perpendicular to a vertical axis.

In the specification, the term "movement along the (long) axis" should be understood to mean that the cassette or optical device can be moved in such a way that the axis of the enclosed sample-receiving channel moves under a fixed observation area. For example, if the axis of the enclosed sample-receiving channel forms a straight line, the motion would be rectilinear. If the axis of the enclosed sample-receiving channel forms a circle, the cassette could be rotated about a central fixed vertical axis, with the observation area at a distance from the fixed axis equal to the mean radius of the enclosed sample-receiving channel. The cassette can be held fixed while the optical device moves or vice versa.

The cassette facilitates the sampling and concentration of oocysts and other parasites and particulate matter in a flotation solution to be viewed directly under an image capturing device, such as a microscope or image capturing device, and is simple to use without any need for training or lab skills. This system provides a robust, sensitive, low cost, time-reducing alternative method to be used for examining larger volumes of sample. This, therefore, increases sensitivity for determining the presence of parasites and it can be used by a lay person. Other advantages include:

Concentration of a surface layer of sample for efficient and reduced analysis time;

No need for centrifugation to concentrate the sample;

An enclosed system allows the device to be used in sequence with an image acquisition device for automated analysis of a sample on site rather than in a laboratory;

High sensitivity potential as the sample volume can be larger than the current reference standard McMaster or mini-FLOTAC® systems;

The entire sample surface can be examined by a one-dimension motion of the cassette in the image capturing device or the image capturing device moving along the cassette, as the particles are concentrated in a band that is designed to be the width of one field of view of the objective lens of the device;

The angle of the walls of the enclosed sample-receiving channel in the cassette are designed to minimise adhesion of eggs to the walls. Adhesion is further reduced by coating the internal surface of the enclosed sample-receiving channel walls with a thin layer of a hydrophobic or hydrophilic chemical. Vibration can also be used to reduce static friction of any trapped eggs/particles;

By concentrating the parasite particles in a smaller surface area, the system is ideal for automated digital recognition of parasites within a sample without losing sensitivity by reducing sample size. It is also time saving for a user, such as a laboratory technician, operator, as only a fraction of the surface needs to be examined for the presence of parasite particles;

Because the surface area to volume is kept to an optimum level, there is no need for centrifugation in order to sufficiently isolate the particles from debris for identification and quantification for the final analysis;

The geometry of the enclosed sample-receiving channel remains unchanged throughout the entire process of the system and method described herein;

The system has also been designed to remove any necessity for trained staff or laboratory involvement, and only requires some simple steps to operate. This allows the use of the device in remote situations, where the samples are collected, with results available within a short time;

The system described herein deals with 2 ml of a 10:1 floatation solution:faecal matter solution sample, therefor representing 0.2 g of faecal matter, which yields a sensitivity of 5 eggs per gram; and The volume capacity of the cassette can be increased by increasing the diameter of the cassette. As connectivity improves and data transfer becomes less of a limiting factor for the number of image acquisitions, the volume can be increased to increase the sensitivity of the test. Once the cassette has been filled with the suspension solution and placed on the device and activated, there is no further human intervention required for results to be processed.

The platform increases the concentration capability of the channel by maintaining a limited depth directly underneath the viewing area while increasing the area of the cross section of the channel generated from the two reservoirs on either side of the platform and hence the volume of the cassette.

One of the advantages of the cassette described herein is that there are no moving parts in the cassette. When making the system automatic, this makes the cassette much simpler to design, manufacture, assemble, and operate. It reduces the power requirements and improves mechanical reliability and robustness. It reduces all associated costs. In the FLOTAC® system, once the upper plate is rotated ("translated"), any eggs or other particles that haven't reached the surface of the flotation chamber during the waiting time will be left behind permanently, thus reducing the accuracy of that system. In the proposed cassette, there is no such skimming process, so there is no flotation cut-off time until the images are finally captured.

Another advantage of the cassette and system of the invention is the determination of whether an animal in a herd carries a parasitic infection or not. Identifying infected animals and the level of infection will help inform the user whether or not an animal(s) should be treated to prevent disease. On the other hand, if animals in the herd are shown to be free of a parasitic infection, it can inform the user that there is potential for the herd to pick up a parasitic infection. The data collected from herds in a region using the system and cassette of the invention, could also aid in the study of the epidemiology of parasites and the tracking of the spread of disease through a region. The amalgamated results from a number of herds can provide geographical trends of the prevalence and incidence of parasite infection as well as the emergence of treatment failures. This information can be made available to national and international disease surveillance organisations and other third parties by providing them with access to the data that is generally stored in the cloud. It may also provide information on the resistance of a particular parasite to a drug. For example, by using specific faecal egg count reduction tests (FECRT), which measures the faecal egg count prior to treatment, the efficacy of a specific drug against a specific parasite can be evaluated by measuring the percentage reduction in faecal egg counts between pre- and post-treatment faecal samples.

BRIEF DESCRIPTION OF THE DRAWINGS

The invention will be more clearly understood from the following description of an embodiment thereof, given by way of example only, with reference to the accompanying drawings, in which:—

FIG. 2A illustrates a cross-sectional view of the cassette of FIG. 1, while

FIG. 7A illustrates an oocyst (circled) from Nematodirus and the characteristics of the interior of the oocyst are clearly visible. FIG. 7B shows that air bubbles (circled) are easily identified. FIG. 7C shows that fainter oocysts (circled) represent Coccidia.

DETAILED DESCRIPTION OF THE DRAWINGS

The present invention describes a system comprising an image capturing device with a magnifying lens, a cassette designed to hold a specific volume of a liquid sample, image analysis software designed to recognise and count specific items/particles of interest, and a kit to simplify the procedure for an end user.

Figure 1A:
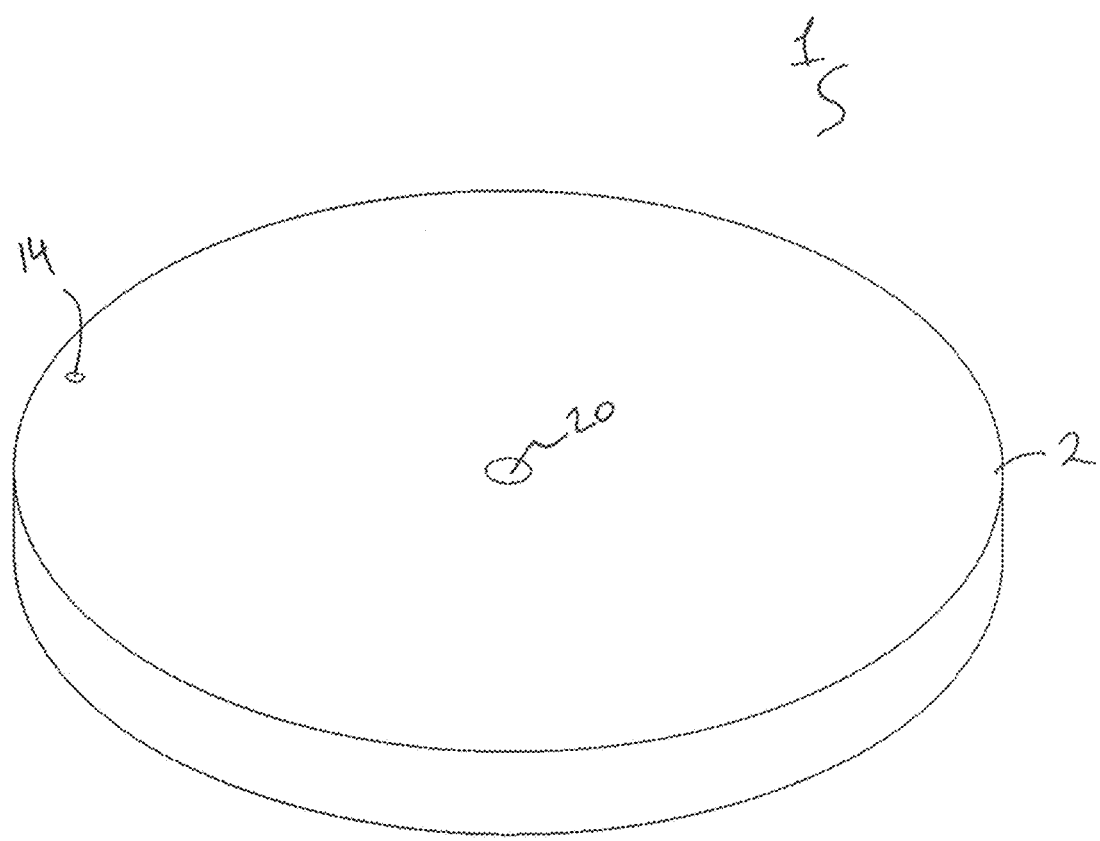
FIG. 1A and FIG. 1B illustrate perspective views of an example of a cassette of the invention, where the cassette is disk-shaped, with and without a cover, respectively. The cassette of FIG. 1B can be determined as being with and without a separate cover, where the overall cassette is transparent and where the cover is also transparent, thus giving the same internal view.
Figure 1B:
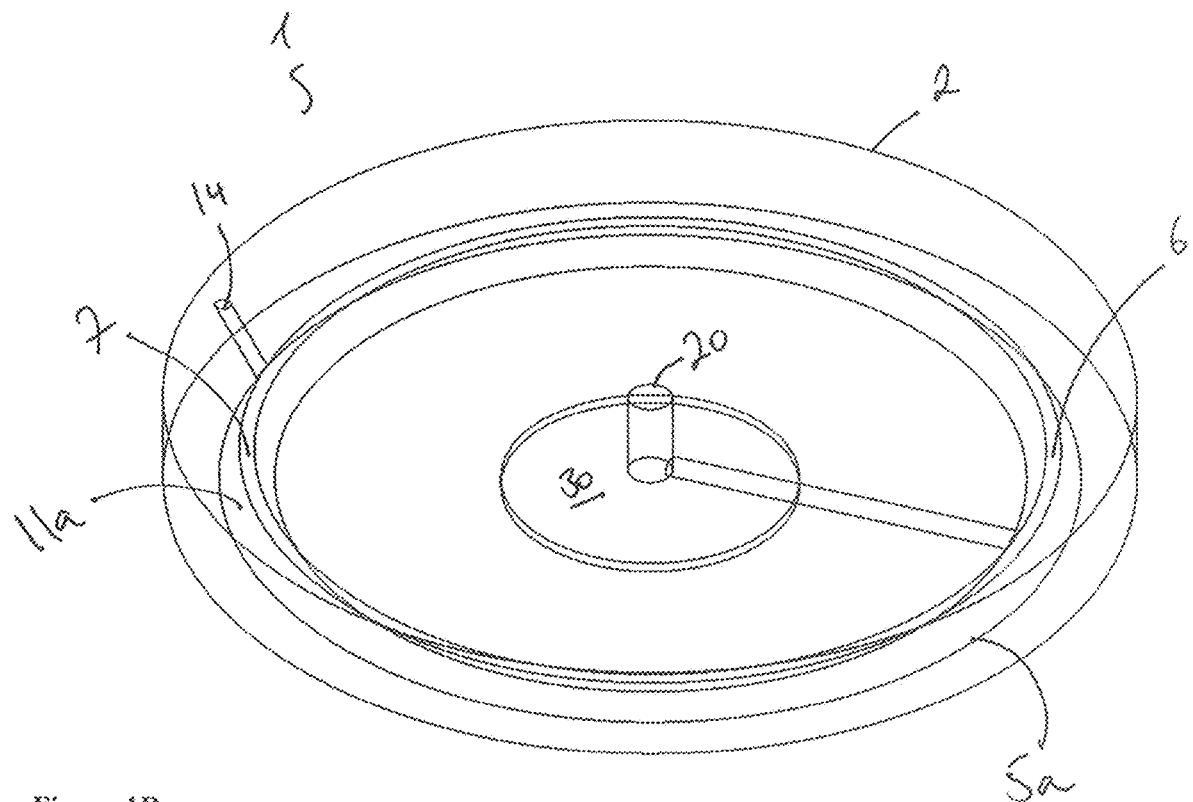
Figure 2A:
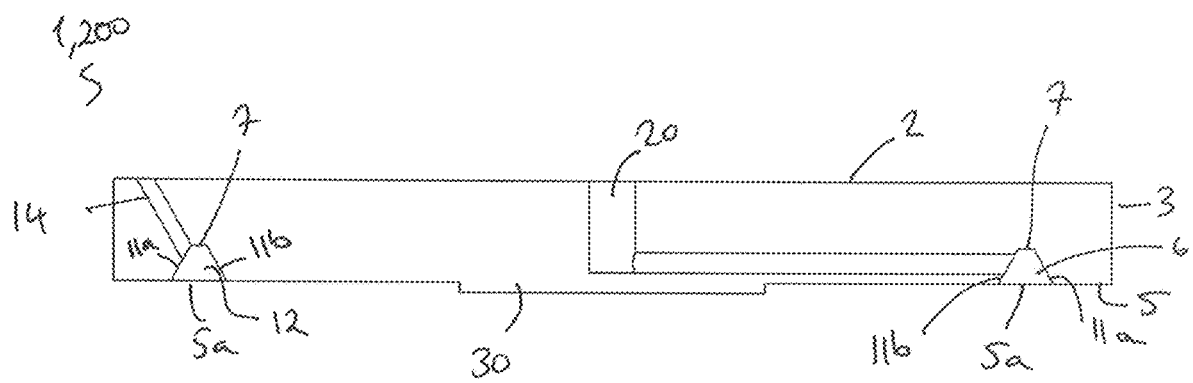
Figure 8:
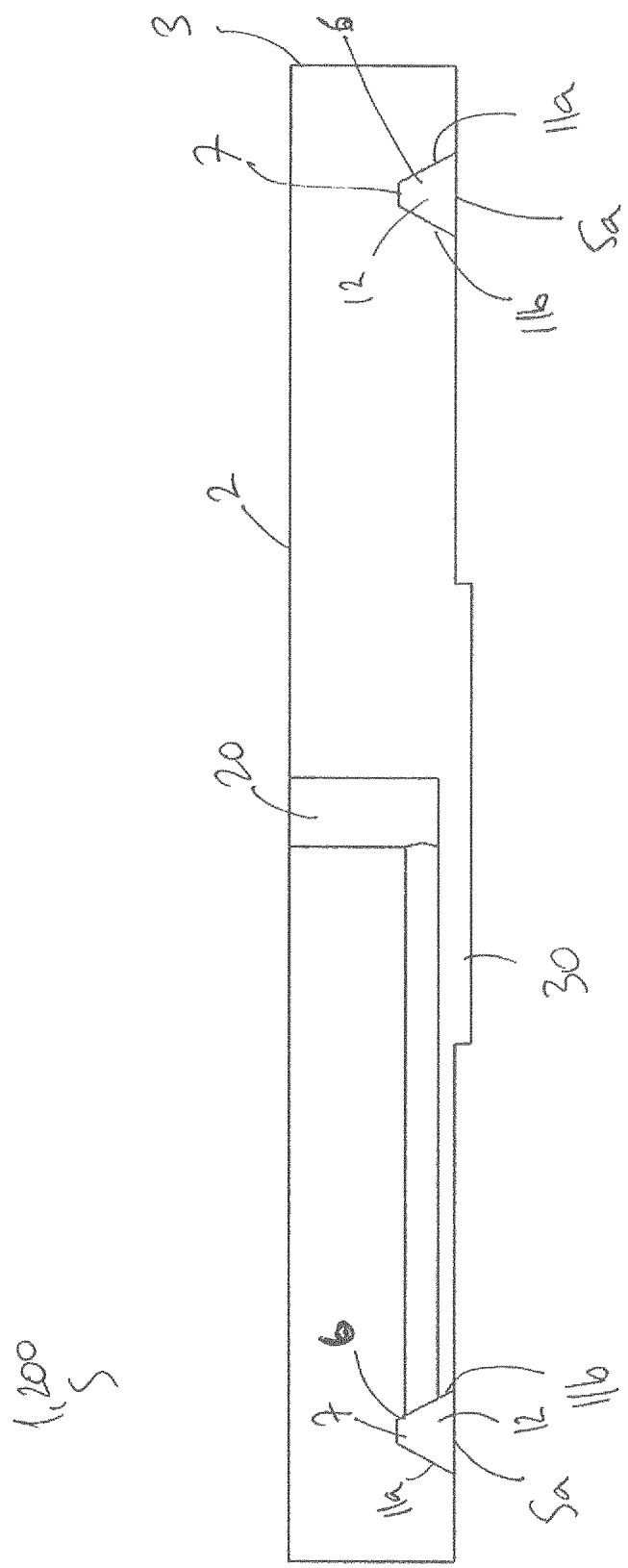
FIG. 8 illustrates a side, cross-sectional view of an example of a cassette of the invention.
Figure 9A:
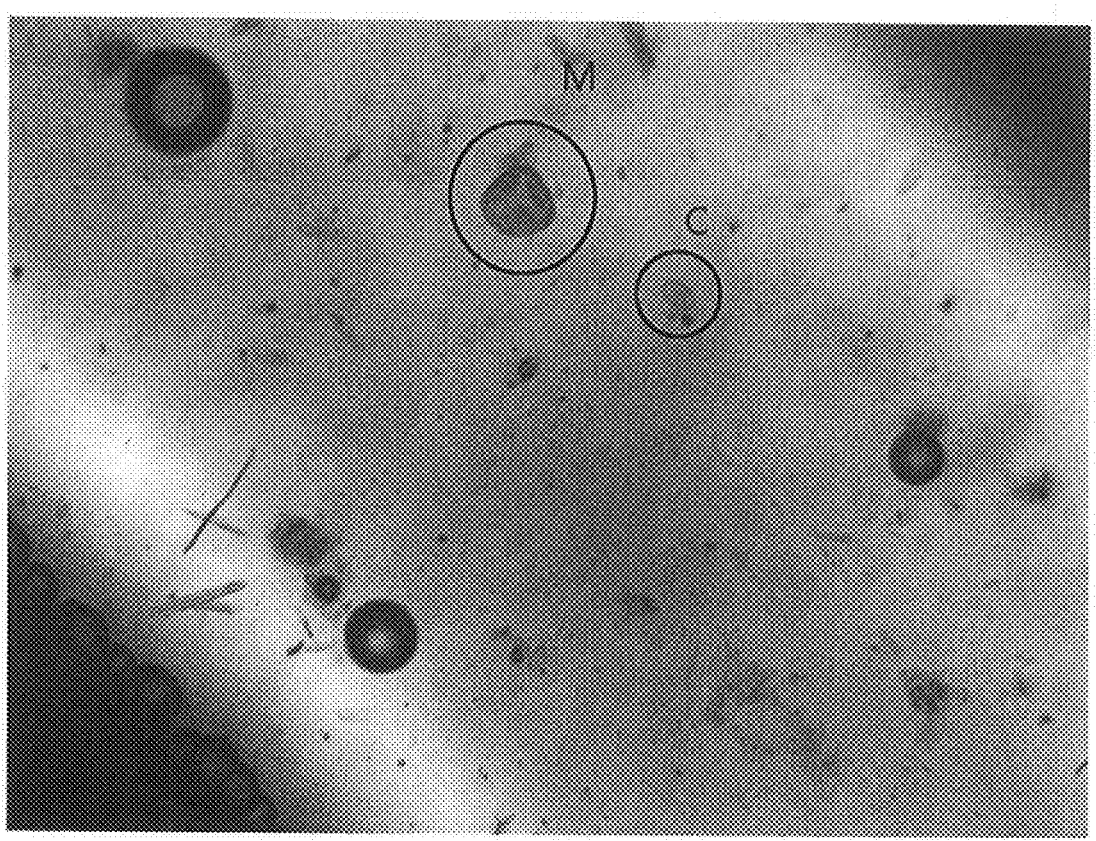
FIG. 9 illustrates a typical photomicrograph of one FOV of eggs from ovine (FIG. 9A, 9B), bovine (FIG. 9C, 9D) and equine (FIG. 9E) faecal samples visible (circled) in the channel of the cassette of the claimed invention and which was captured using the optical system described in the invention. The types of eggs are labelled as follows; N=Nematodirus; M=*Moniezia*; C=coccidia; S=Strongyles. The *Moniezia* and Strongyles eggs were not shown in FIG. 7.
Figure 9B:
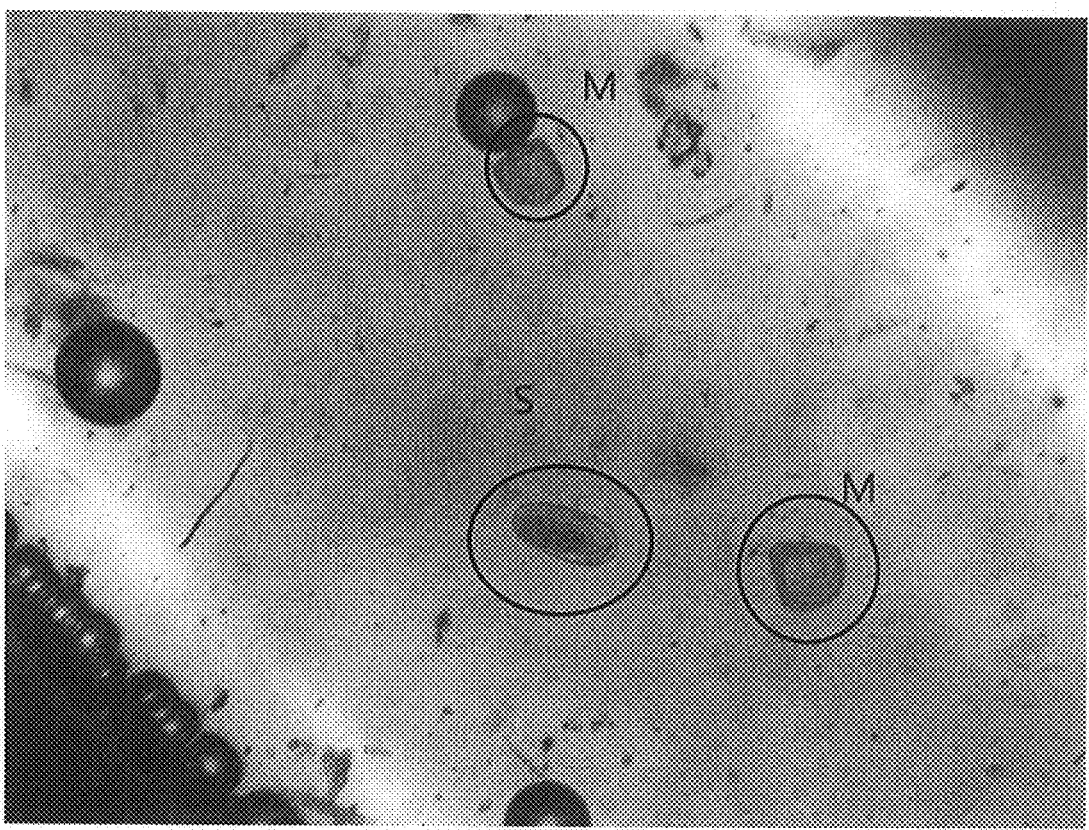
Figure 9C:
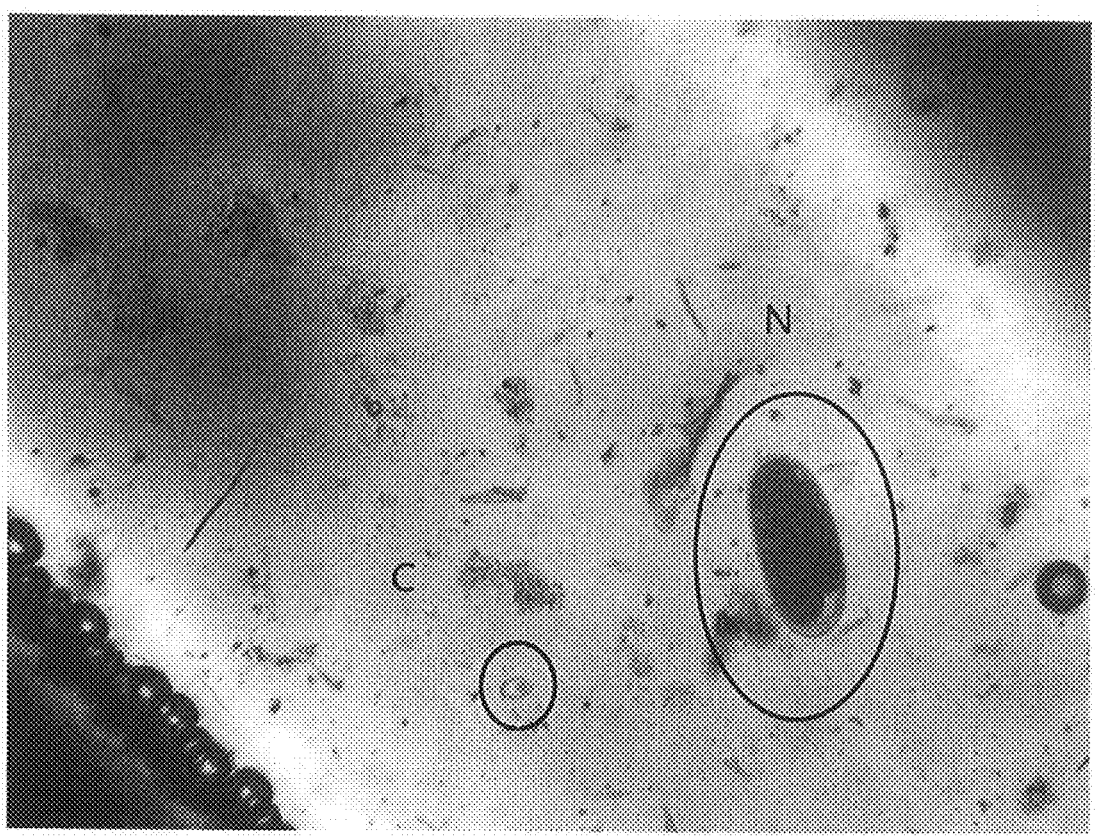
Figure 9D:
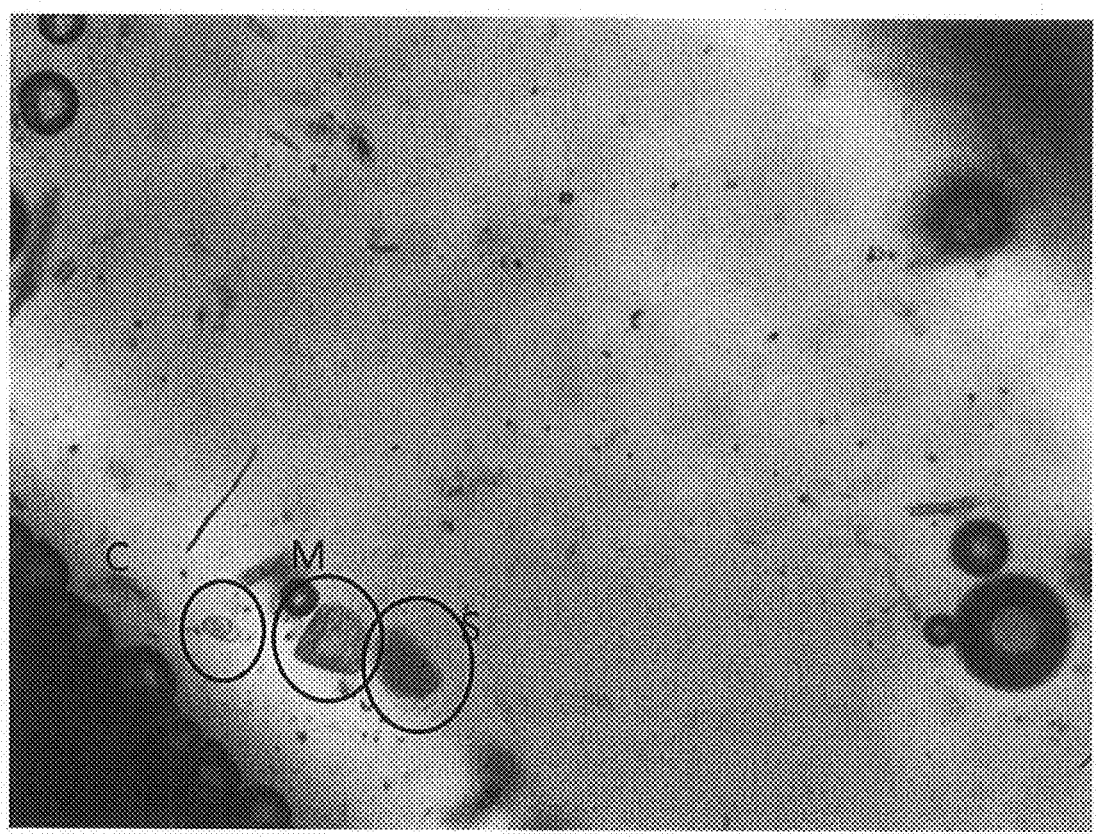
Figure 9E:
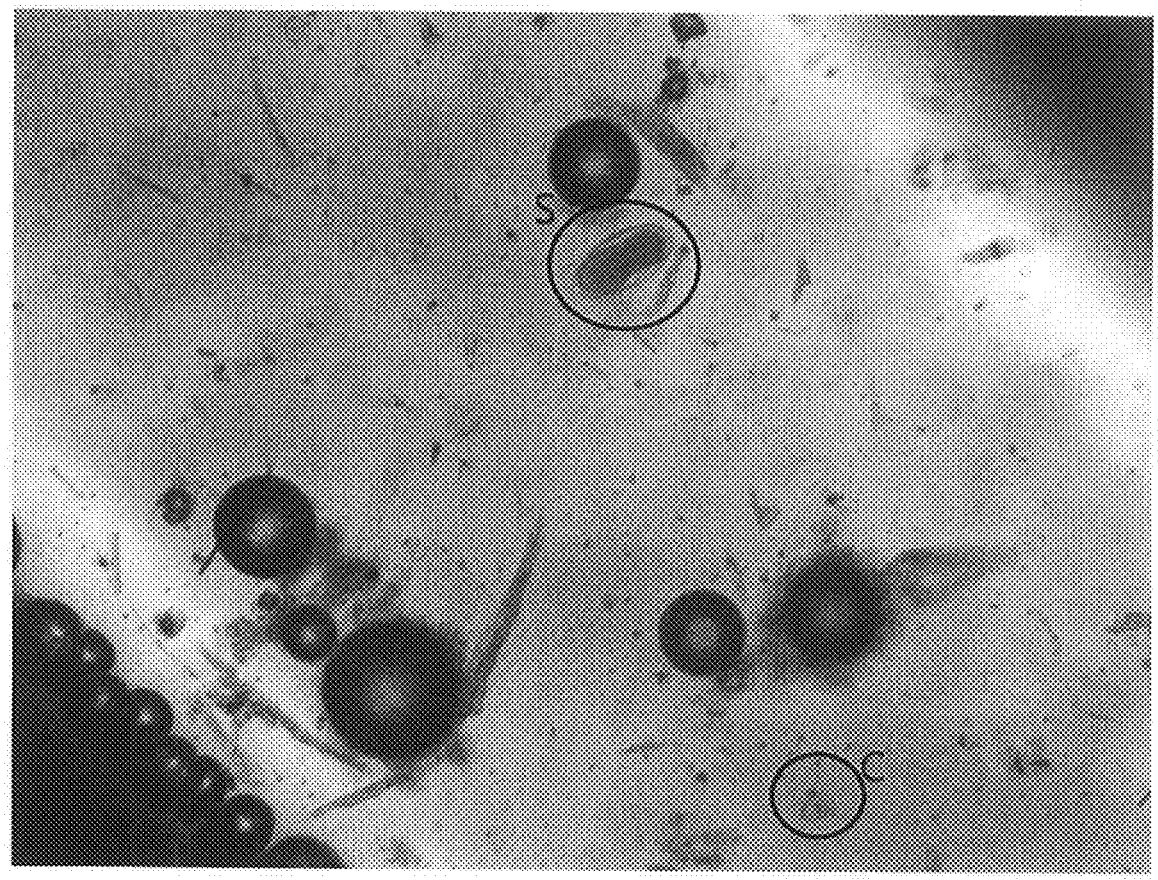

Referring now to the figures, where FIG. 1, FIG. 2 and FIG. 8 illustrate one embodiment of a cassette of the present invention. Specifically, FIG. 1 illustrates a perspective view of one embodiment of a cassette of the present invention and is generally referred to by reference numeral 1. FIG. 2A and FIG. 8 illustrate the cassette 1 of FIG. 1 in cross-section. The cassette 1 comprises a housing 2 having an outer wall 3, a hole 30 configured to accommodate an actuator or motor drive shaft and a support 5. The housing 2 of the cassette 1 can be with or without an outer wall 3. The support 5 forms a base 5a of an enclosed sample-receiving channel 6, which is situated between the hole 30 and outer wall 3. The enclosed sample-receiving channel 6 comprises walls 11a, 11b which form a conduit 12 adapted to accommodate a liquid sample. The housing 2 further comprises an inlet port 20 in fluid communication with the enclosed sample-receiving channel 6. The inlet port 20 is configured to receive the liquid sample and deliver the sample to the conduit 12 of the enclosed sample-receiving channel 6. In some embodiments, and opposite the inlet port 20, can be positioned a (small) air release port 14, which permits air to escape when the liquid sample is being applied to the enclosed sample-receiving channel 6 via the inlet port 20 (see FIG. 2A).

Figure 2B:
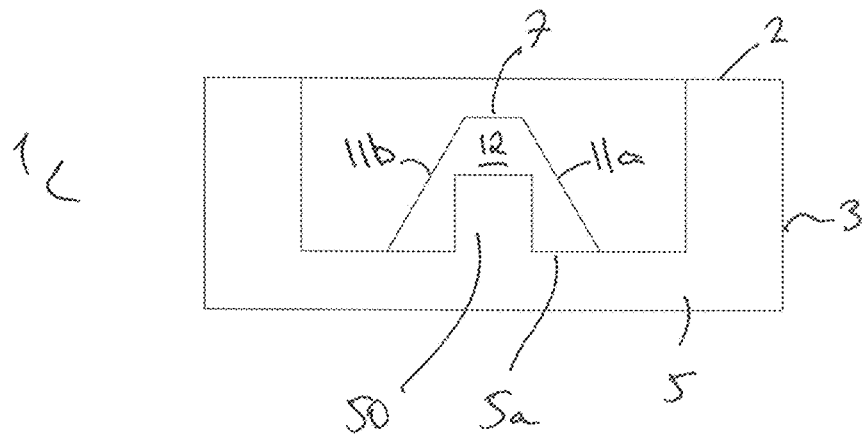
FIG. 2B illustrates a cross-sectional view of the enclosed sample-receiving channel of FIG. 1 having a platform.

As shown in FIG. 1, FIG. 2 and FIG. 8, the enclosed sample-receiving channel 6 in cross-section shows the walls 11a,11b form a trapezoid shape with an upper portion 7 parallel to the support 5. The upper portion 7 is preferably transparent or translucent. The walls 11a,11b can be coated on the side facing the conduit 12 with a hydrophobic or a hydrophilic material. The conduit 12 concentrates buoyant matter in the liquid sample at the upper portion 7. The width of the upper portion 7 is determined by the field of view (FOV) of an image capturing device 100 (see FIG. 4). Ideally, the width of the upper portion 7 corresponds to the width of the FOV, so that the entire upper portion 7 can be successively scanned simply by either rotating the cassette 1 through 360° or rotating an imaging capturing device through 360°, with no additional relative motion required. As shown in the FIG. 2B, the enclosed sample-receiving channel (optionally) further comprises a raised platform 50 extending upwards from the base 5a. The raised platform 50 is distinctly separate (FIG. 2B) from one or both of the walls 11a,11b and the upper portion 7. The advantage of having a raised platform 50 is that there is a smaller, shallower depth to the channel 6 directly under the viewing area but larger volumes in the reservoirs either side of the platform 50, which results in a smaller volume of liquid under the objective lens of the microscope or image reader. This smaller volume of liquid reduces the blurriness caused by diffraction of light through a liquid. The raised platform 50 remains free of, and never comes in to contact with, the walls 11a,11b and the upper portion 7.

Figure 3:
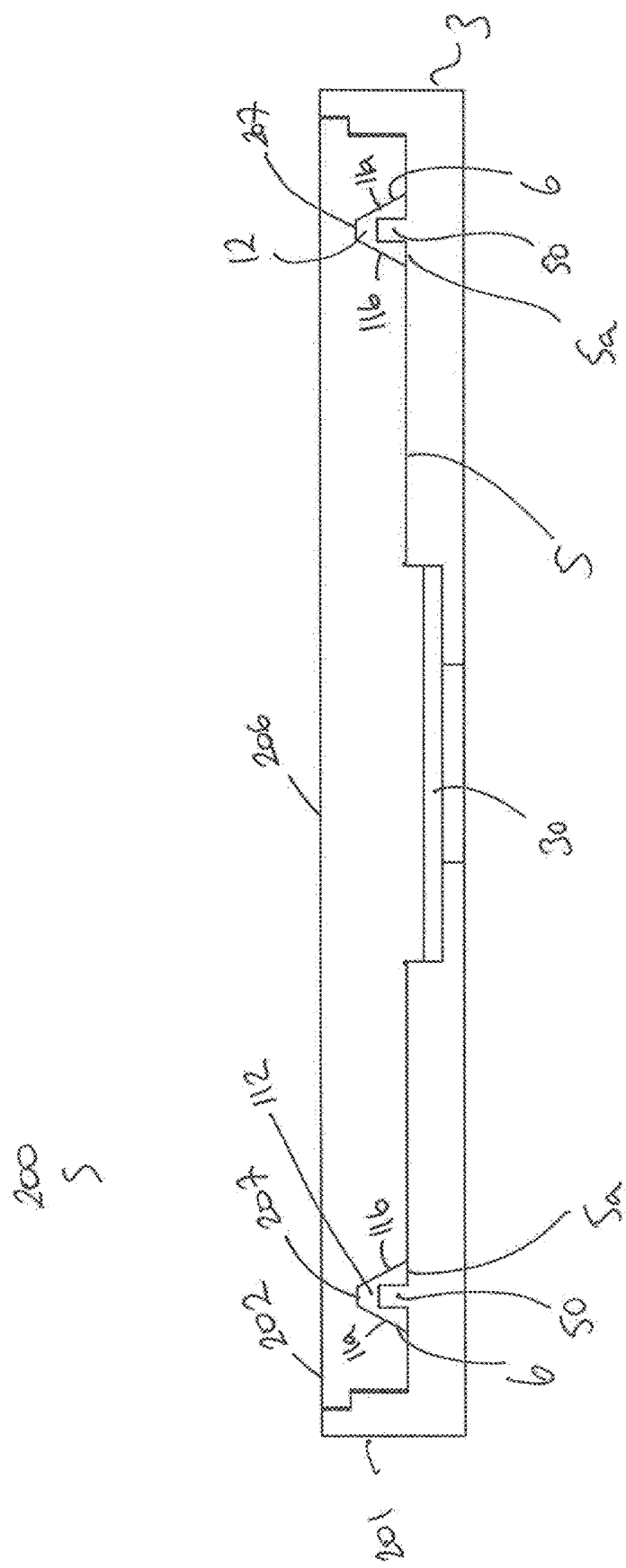
FIG. 3 illustrates a cross-sectional view of one embodiment of a cassette of the invention where the cassette is a single piece and the enclosed sample-receiving channel further includes a platform.

Referring now to FIG. 3, there is illustrated a cross-section view of one embodiment of the cassette of the invention, and is given reference numeral 200, in which parts or steps described with reference to the previous embodiment are assigned the same numerals. The cassette 200 is a two-piece object consisting of a lower section 201 and an upper section 202. The lower section 201 comprises an outer wall 3; a hole 30 configured to accommodate an actuator or motor drive shaft; a support 5 with an enclosed sample-receiving channel 6 positioned thereon and between the outer wall 3 and the hole 30. The lower section 201 of the cassette 200 can be used with or without an outer wall 3. The enclosed sample-receiving channel 6 in cross-section shows the walls 11a,11b angled such that they form a trapezoid shape. The portion of the support 5 closed off by the walls 11a,11b forms the base 5a of the enclosed sample-receiving channel 6. The walls 11a,11b can be coated on the side facing the conduit 12 with a hydrophobic or hydrophilic material.

The upper section 202 has a top surface 206 and a bottom surface 207 and is preferably transparent or translucent. The upper section 202 further comprises a small air release port 14 in fluid communication with the closed sample-receiving channel 6. The small air release port 14 is configured to permit air to escape when the liquid sample is being applied to the enclosed sample-receiving channel 6 via the inlet port 20. The inlet port 20 is configured to receive the liquid sample and deliver the sample to the conduit 12 of the enclosed sample-receiving channel 6. The upper section 202 is configured to reversibly engage with the walls 11a,11b of the enclosed sample-receiving channel 6. The bottom surface 207 is configured to sit parallel to the support 5 and to rest on top of the walls 11a,11b of the enclosed sample-receiving channel 6, forming an upper portion 208 through which a lens of the image capturing device 100 can detect buoyant matter in the conduit 12. The engagement of the upper section 202 with the walls 11a,11b form an air-tight seal. The conduit 12 concentrates buoyant matter in the liquid sample where the upper section 202 forms the seal with the enclosed sample-receiving channel 6, that is, at the area of the upper portion 208.

Figure 4:
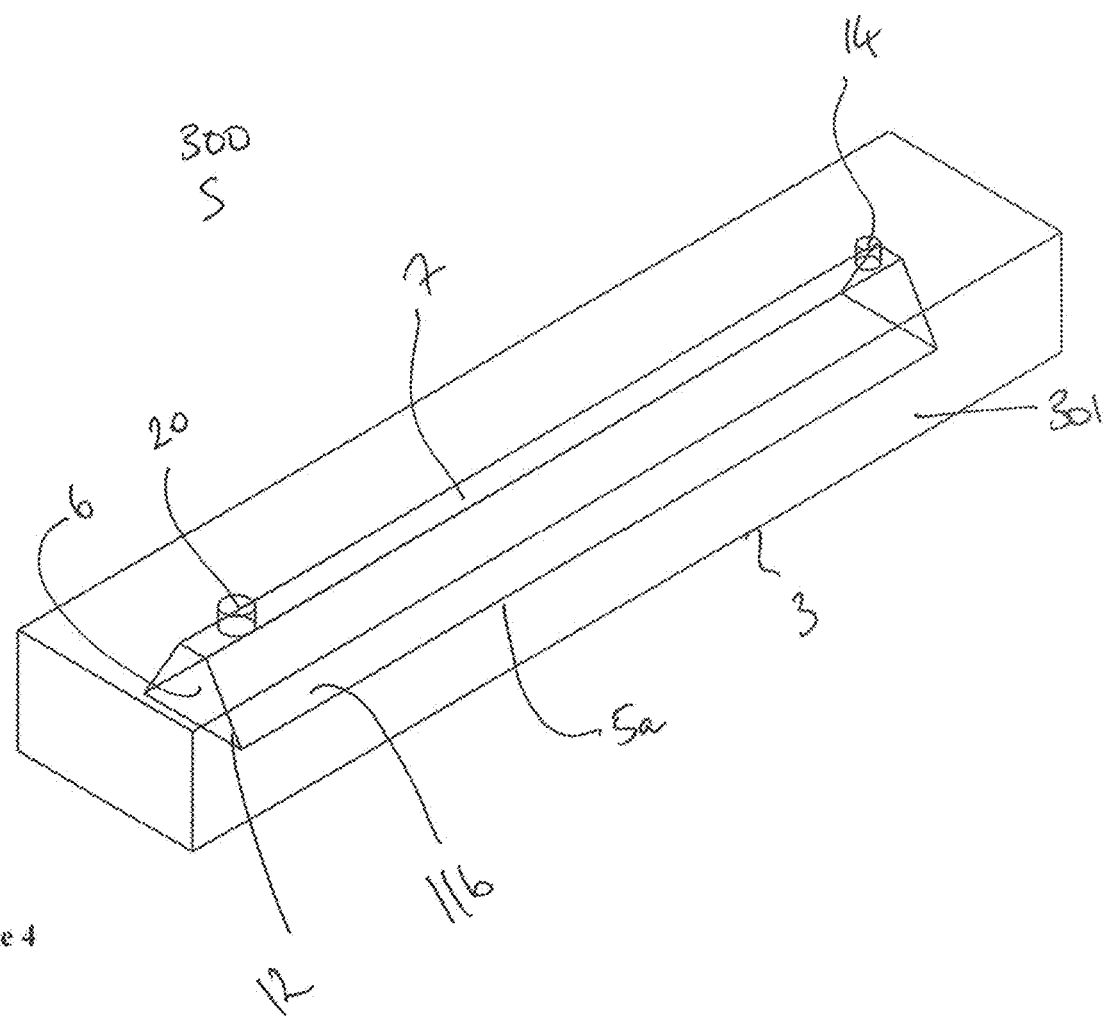
FIG. 4 illustrates an example of one embodiment of a cassette of the invention, where the cassette is a quadrilateral or linear in shape, without a platform.

Referring now to FIG. 4, there is illustrated another embodiment of a cassette, which is provided with reference numeral 300, and in which parts or steps described with reference to the previous embodiment are assigned the same numerals. The cassette 300 is linear or quadrilateral in shape. The cassette 300 comprises a housing 301 having an (optional) outer wall 3, a support 5 with an enclosed sample-receiving channel 6 positioned thereon. The enclosed sample-receiving channel 6 comprises walls 11a,11b which from form a conduit 12 adapted to accommodate a liquid sample. The enclosed sample-receiving channel 6 shown here has walls 11a,11b angled to form a trapezoid shape with an upper portion 7 parallel to the support 5. The portion of the support 5 closed off by the walls 11a,11b forms the base 5a of the enclosed sample-receiving channel 6. The upper portion 7 is preferably transparent or translucent. The walls 11a,11b can be coated on the side facing the conduit 12 with a hydrophobic or a hydrophilic material.

The conduit 12 concentrates buoyant matter in the liquid sample at the upper portion 7. The width of the upper portion 7 is determined by the FOV of an image capturing device 100 (see FIG. 3). Ideally, the width of the upper portion 7 corresponds to the width of the FOV, so that the entire upper portion 7 can be successively scanned simply by either moving the cassette 300 or the image capturing device 100 in one plane.

Figure 5A:
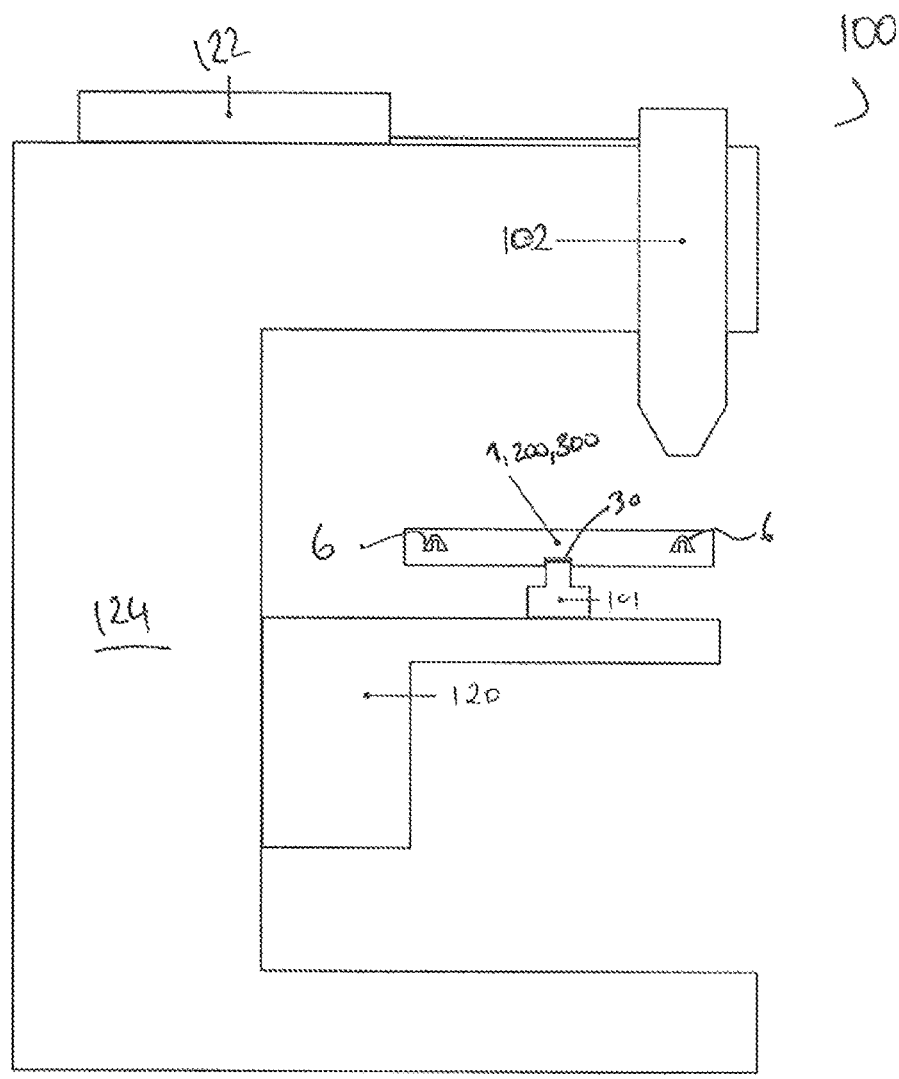
FIGS. 5A and 5B illustrate a typical image capturing device for use with the cassette illustrated in FIGS. 1 to 4.
Figure 5B:
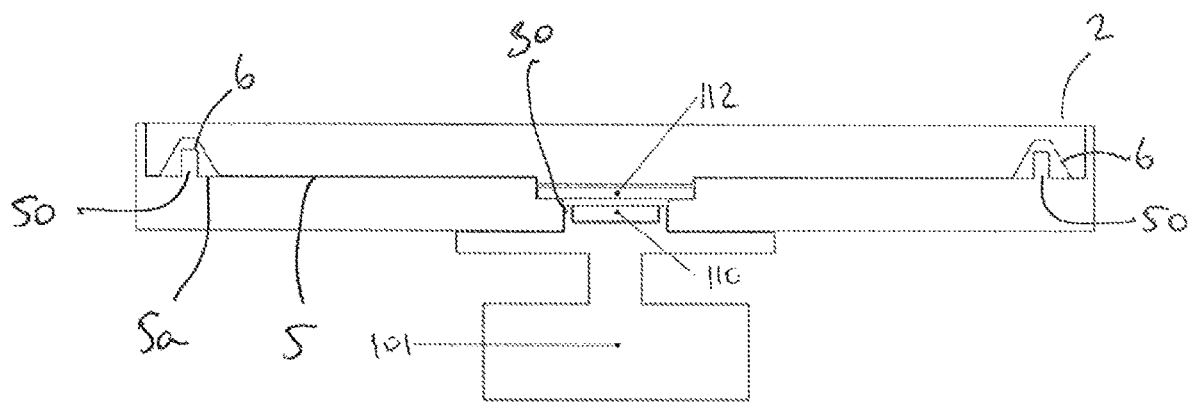

Referring now to FIG. 5, there is illustrated an image capturing device 100 suitable for use with the cassette 1,200,300 described above. In this figure, a typical compound microscope is illustrated as the image capturing device 100, with a stage 120, an objective lens 102 (4×/NA0.1 plan), corrected for 160 mm focal distance, and a detector 122 (Raspberry Pi camera with 8 Mpi). The image capturing device 100 comprises an actuator 101 that rotates or moves the cassette 1,200,300 along a certain axis, the objective lens 102, a sensor (illustrated as the detector 122), one or more illumination source(s), a computer, a transmitting device, a suitable housing 124, and a power source.

The actuator 101 is an electric motor that rotates the cassette 1,200, or moves the cassette 300 along a plane, causing the enclosed sample-receiving channel 6 to pass under the objective lens 102 of the image capturing device 100. The hole 30 of cassette 1,200,300 is configured to accommodate the actuator 101, locking the actuator 101 and cassette 1,200,300 together so that they rotate/move together. The locking of the actuator 101 and the cassette 1,200,300 can be achieved by the typical systems known in the art for mounting a cassette or slide on a microscope stage. For example, the locking can be achieved by a magnetic force generated between a magnet 110 that is mounted on the actuator 101 and a magnetic disc 112 that is placed inside the cassette 1,200,300. Alternatively, the locking can be achieved by a receptacle moulded into the base 5 of the cassette 1,200,300 that is a fit for a shaft coupled to the actuator 101 locking them together. The cassette 1,200, 300 remains square with respect to the central axis of the device 100, thereby ensuring a constant distance from the objective lens 102 of the device 100 to the upper portion 7,208 of the cassette 1,200,300.

The cassette 1,200,300 also maintains its square position with the central axis of the capturing device 100 to the upper portion 7,208 of the cassette 1,200,300 to maintain the correct distance from camera to the cassette. If necessary any deviation of this can be negated by, for example, minor adjustments of the vertical distance of the cassette 1,200,300 relative to the lens 102 using actuators.

To use the cassette 1,200,300 with the image capturing device 100, a liquid sample must be prepared. The sample is prepared by a method as described in the prior art which is typical of preparing a sample for analysis and is as follows. For example, 45 ml of a flotation solution (FS) is measured into a graduated cylinder. A sample is firstly homogenised thoroughly and 5 g of the homogenised sample is added to the flotation solution to provide a sample suspension. The dilution ratio of sample:flotation solution is measured by volume (typically a dilution ratio of 1:10). The sample suspension is further homogenised thoroughly in the graduated cylinder using a spatula and passed through a filter. The pore size of the filter will be determined to be at least 5% greater than the largest dimension in the range of specific matter being identified in the test. For example, if the specific matter being identified in the test has a diameter of 100 μm, the pore size of the filter will be 105 μm. The sample is then further filtered through a wire mesh having a pore size of, for example, 212 μm, so as to remove any remaining large debris.

A portion of the filtered sample is obtained using a syringe. The filtered sample is mixed thoroughly and constantly while the sample is being taken.

Once the sample is prepared by one of the methods set out above (or any suitable method for preparing such samples), the sample is introduced with minimum delay after preparation to the inlet channel 20, with maximum retention of the buoyant particles of interest, and with minimum (ideally zero) entrapped air or gas, especially when the latter is in the form of microscopic bubbles. The prepared sample is passed into the conduit 12 of the enclosed sample-receiving channel 6 via the inlet port 20 using a syringe or similar pumping mechanism. A small air release port 14, opposite the inlet port 20, allows the air in the conduit 12 to escape as the liquid sample enters the enclosed sample-receiving channel 6 (see FIG. 1B and FIG. 2A). The cassette 1,200,300 can be held, during sample loading, so that the central axis of the cassette 1,200,300 is horizontal and parallel to the ground, with the plane of the cassette 1,200,300 therefore vertical and perpendicular to the ground. The inlet port 20 should be directly below the central axis of the cassette 1,200,300, and the air release port 14 at the opposite point, directly above the central axis, so that bubbles will naturally tend towards the air release port 14 due to their buoyancy in the sample. The filling of the conduit 12 is complete when the sample reaches this small air release port 14. The effect of the inlet port 20 will be to hold the sample inside, with no tendency to leak out at the air release port 14, which can therefore be left unsealed and open.

Now looking at FIG. 5A, the lens 102 of the image capturing device 100 is configured to achieve the maximum FOV with the minimum requirement of resolution needed for the automated analysis to optimise processing time and performance. This is achieved by matching the optical resolution power of the lens 102 to the pixel resolution of the camera, as denoted by the following formula:

$$R = 1.22\lambda/(NAobj + NAcond) \approx 0.61\lambda/NA \approx \lambda/2$$

For $\lambda = 520$ nm (green light)

R=3 μm, the minimum distance between resolvable points, in the same units as lambda specified.

NA=0.1 (Numerical aperture of the lens used)

This is the level of detail recognisable by the objective lens 102 used. The detector 122 should perform similar levels to get the best of the system. Therefore, one must decrease the working distance to reduce magnification and gain with respect to the field of view.

The size of the field of view now matches the width of the enclosed sample channel 6 in the cassette 1,200,300. The internal surfaces of the holder of the lens 102 can have a sandpaper or felt lining (or similar surface which reduces or inhibits reflection of light) to reduce any internal reflections, which could distort or reduce the clarity of the image on the sensor/detector 122 of the image capturing device 100. The column between the lens 102 and the sensor/detector 122 in the image capturing device 100 has a minimum diameter to alleviate internal reflections that may cause aberration of the image being taken. The image capturing device 100 has been selected to achieve a low-cost solution while achieving suitable resolution and quality of image.

The width of the upper portion 7,208 is determined by the FOV of the objective lens 102 of the image capturing device 100 at the chosen magnification. By making the width of the upper portion 7,208 correspond to the width of the FOV, the entire surface of the enclosed channel 6 can be scanned by motion of the cassette 1,200,300 in one direction or in one plane only or by motion of the objective lens 102 in one direction or one plane only.

Figure 6:
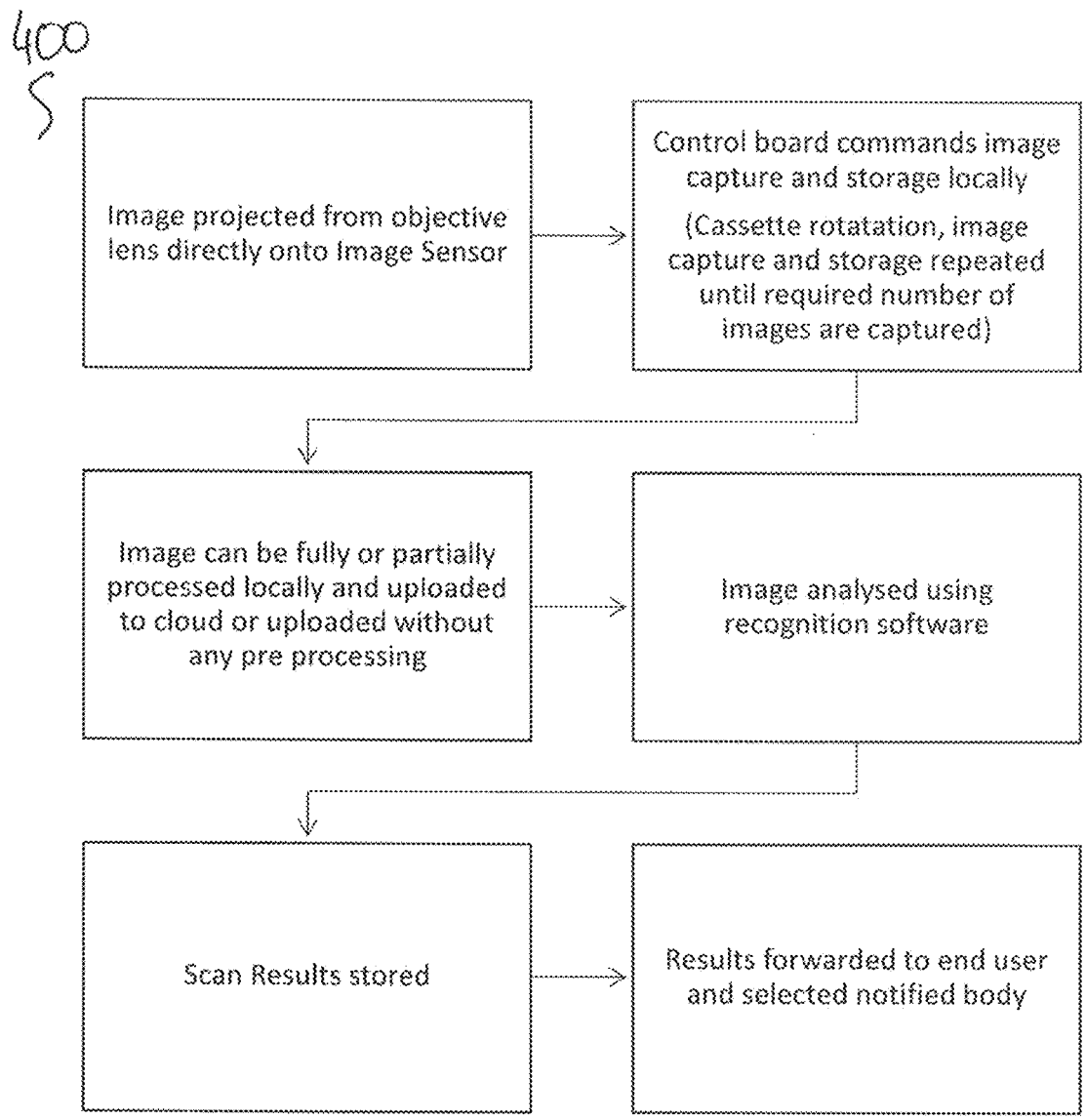
FIG. 6 illustrates a typical data collection system used in conjunction with the determination system of the invention.

FIG. 6 illustrates, by way of a block-diagram, a system 400 for obtaining images of a sample loaded in the closed sample-receiving channel 6 of the cassette 1,200,300. Images obtained from the closed sample-receiving channel 6 are captured in sequence as the actuator 101 moves the cassette 1,200,300 in a one plane only until the entire surface area of the enclosed sample-receiving channel 6 is covered or a sufficient representative series of images has been captured. Alternatively, the actuator 101 moves the objective lens 102 until the entire surface area of the enclosed sample-receiving channel 6 is covered or a sufficient representative series of images has been captured. These images are processed by image analysis software to establish the presence or absence of specific microorganisms or other items of interest. An example of this would be a farmer carrying out a count of eggs of one or more specific parasites present in a faecal sample taken from animals on a farm. It is also possible for the user to send the results of any test to a cloud-based database for storage and subsequent analysis. In this way, or by other methods, by comparing results from different locations, or from the same location over time, the growth, spread or containment of parasitic infection can be monitored. This information could be very valuable at local, regional, national and international levels, for example to monitor patterns of infestation of livestock. National entities, such as a government department of agriculture, or regional authorities, for example at a European level, could use this information for setting policies on animal treatment, animal movements, disease control, veterinary practice, etc.

Figure 7A:
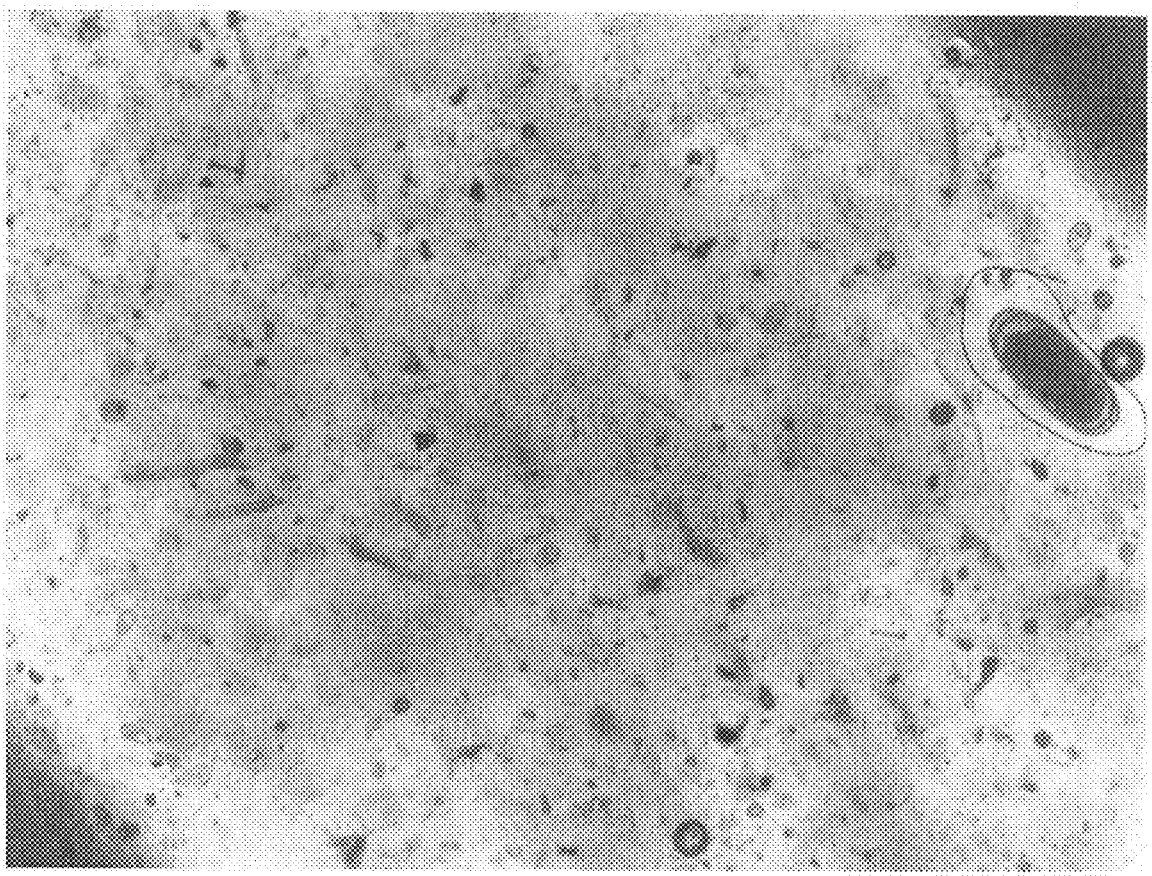
FIG. 7A-C illustrate a typical photomicrograph of one FOV of an ovine faecal sample prepared as outlined below using the cassette described herein and the system as shown in FIG. 5A.
Figure 7B:
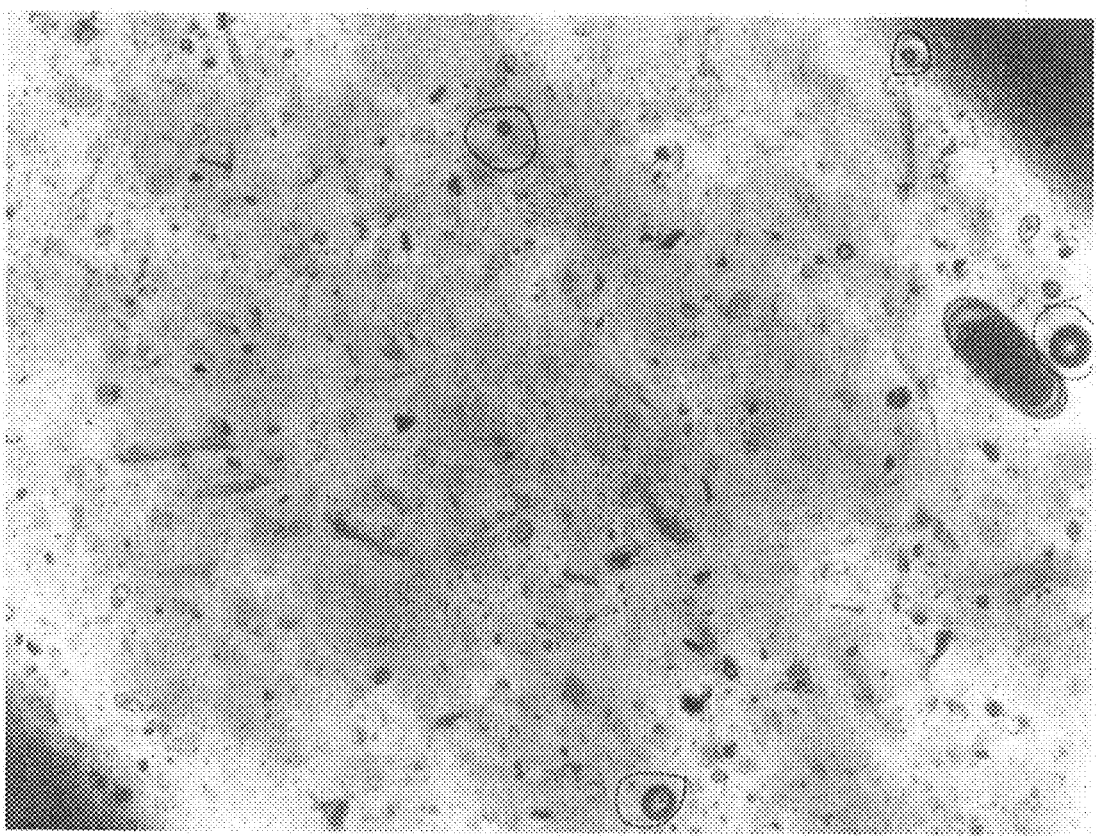
Figure 7C:
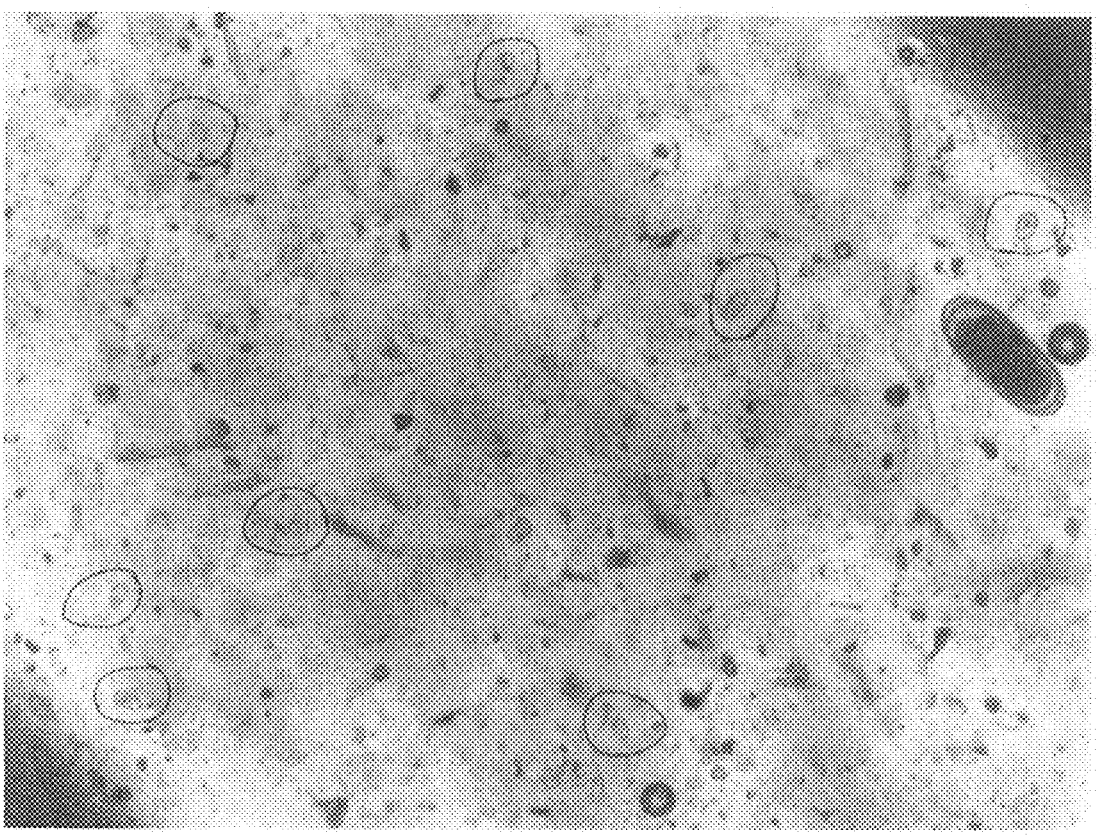

Turning now to FIG. 7, the ability to differentiate between species using an image recognition algorithm will be directly proportional to the quality of the image captured and the contrast achieved. The contrast in FIG. 7A is sufficient for the human eye to differentiate shapes based on aspect ratio, contrast and characteristic of the interior of the oocyst. The dark ringed spherical shapes marked in FIG. 7B clearly identifies air bubbles. The fainter oocysts marked in FIG. 7C represent Coccidia. The concentration of the items of interest (for example, oocysts) in the cassette described herein increases the capturing efficiency over the prior art devices by decreasing the number of images required for an automated capture. Thus, the cassette and the system of the claimed invention provides a distinct advantage of being capable of analysing higher volumes while acquiring less images, in an automated process, where these images can be captured at a suitable resolution to be able to see items of interest clearly enough to identify them.

Turning now to FIG. 9, there is illustrated a typical photomicrograph of one FOV of eggs from ovine (FIG. 9A, 9B), bovine (FIG. 9C, 9D) and equine (FIG. 9E) faecal samples visible (circled) in the channel of the cassette of the claimed invention and which was captured using the automated system of the invention. The types of eggs are labelled as follows; N=Nematodirus; M=*Moniezia*; C=coccidia; S=Strongyles. The cassette concentrates the particles for identification which enables the process to be automated. As explained above, the concentration of the items of interest (for example, oocysts) in the cassette described herein increases the capturing efficiency over the prior art devices by decreasing the number of images required for an automated capture. The image quality captured and the contrast achieved by concentrating the items of interest using the automated system permits the user to see the items of interest clearly enough to identify them user fewer images, which provides a distinct advantage over the prior art devices, which cannot be automated. This also demonstrates that the cassette and system of the claimed invention can be used to determine the presence of matter from samples across different species.

Materials and Methods

Fresh faecal samples were collected from naturally infected livestock. These were then fixed using a 10% formalin solution (4% formaldehyde) and stored at 4° C. until testing. Composite samples for groups of animals were combined in groups of 10 individuals and mixed well (Morgan et al., 2005 (Morgan, E. R., Cavill, L., Curry, G. E., Wood, R. M., Mitchell, E. S. (2005) Effects of aggregation and sample size on composite faecal egg counts in sheep.

*Veterinary Parasitology.* 131:79-87), Rinaldi et al., 2014 (Rinaldi, L., Levecke, B., Bosco, A., Ianniello, D., Pepe, P., Charlier, J., Cringoli, G., Vercruysse, J., 2014. Comparison of individual and pooled faecal samples in sheep for the assessment of gastrointestinal strongyle infection intensity and anthelmintic drug efficacy using McMaster and Mini-FLOTAC. Vet. Parasitol. 205, 216-223)).

Sample Preparation

The saturated sodium chloride flotation solution is prepared in the laboratory by adding NaCl to 1 l of heated $H_2O$ (40-50° C.) until no more salt goes into solution (400-500 g). NaCl is dissolved using a stirrer and the solution left to fully saturate overnight. The specific gravity (S.G.) is then checked using a hydrometer for an S.G of 1.2 (Cringoli et al., 2010 (Cringoli G. Rinaldi L. Maurelli M. P. & Utzinger J (2010) FLOTAC: new multivalent techniques for qualitative and quantitative copromicroscopic diagnosis of parasites in animals and humans, *Nature Protocols:* 5 (3): 503-515)).

45 ml of the flotation solution (FS) is measured into a graduated cylinder. The preserved sample was well homogenised and 5 g was added to the flotation solution, measured by volume (dilution ratio 1:10). The sample suspension is homogenised thoroughly in the cylinder using a spatula and passed through a (tea strainer) filter having a pore size 5% larger than the particles of interest in the sample. The sample is then further filtered through a wire mesh (pore size of 212 µm) to remove any remaining large debris.

Filling the Device 4 ml of the filtered sample suspension is drawn up into a syringe. Care must be taken at this point to work quickly and to mix the sample in the syringe to avoid egg flotation within the syringe. This can be achieved by inverting the syringe 2-3 times before filling. Fit the syringe into the inlet port (the filling hole) of the cassette, with the cassette held vertically and the inlet port positioned below the horizontal axis. Depress the plunger and fill the enclosed sample-receiving channel, allowing the air to escape through the air-release port at the top. Once the enclosed sample-receiving channel is full, the syringe is removed.

Egg Identification and Count

The number of eggs per gram (EPG) of faeces is calculated by multiplying the observed count with the dilution factor and then divided by the volume of the solution examined—the default unit for reporting FECs is EPG.

Eggs per gram (EPG) calculation for the cassette and system described herein.

1 g of faeces in 9 ml flotation solution; (45 ml of solvent to 5 ml of solute) 2.2 ml in cassette; and multiplication factor of 4.55 to calculate EPG value. (1 g faeces in 9 ml flotation solution (giving a total volume of 10 ml); 2.2 ml examined, therefore, 10 ml/2.2 ml=4.55)

EPG Calculation for McMaster System 1 g of faeces in 9 ml flotation solution; 0.3 ml in slide (given the standard 0.15 ml volume in chamber 1, 0.15 m in chamber 2); and multiplication factor of 33.33 to calculate EPG value. (1 g faeces in 9 ml (giving a total volume of 10 ml); 0.3 ml flotation solution examined, therefore, 10 ml/0.3 ml=33.33)

EPG Calculation for Mini-Flotac 1 g of faeces in 9 ml flotation solution; 2 ml in device (given the standard 1 ml in chamber 1, 1 ml in chamber 2); and multiplication factor of 5 to calculate EPG value. (1 g faeces in 9 ml (giving a total volume of 10 ml), 2 ml flotation solution examined, therefore, 10 ml/2 ml=5).

Results

TABLE 1

Comparison chart for volume examined versus area to be examined, and sensitivity of eggs per gram (EPG):

| Method | Dilution | Total Volume | Area required to be viewed | Sensitivity | Centrifuge needed | Suitable for automated recognition |
|---|---|---|---|---|---|---|
| McMaster | 1:15 | 2 × 0.15 ml | 2 × 1 $cm^2$ | 50 EPG | No | No |
| Flotac ® | 1:10 | 5 ml | 3.24 $cm^2$ | 2 EPG | Yes | No |
| Mini-Flotac ® | 1:10 | 2 × 1 ml | 2 × 3.24 $cm^2$ | 5 EPG | No | No |
| Invention* | 1:10 | 2.2 ml | 1 × 2.82 $cm^2$ | 4 EPG | No | Yes |

*with a 2.2 ml volume and a closed sample-receiving channel profile of 60° angled sidewalls, a channel depth of 3.5 mm, a base of channel 5.54 mm, and a platform size 1.5 mm × 2.5 mm.

The McMaster method as described in Table 1 would theoretically require a minimum contamination level of 50 EPG of faeces to identify 1 egg in 0.3 ml, as opposed to the device and system described herein which would only require a contamination level of 4 EPG to identify 1 egg in 2.2 ml. Therefore, the device and system described herein is more accurate and would be less likely to produce a false negative result.

The device and system described herein can easily increase the volume to be examined, which is in line with the 5 ml examined in the Flotac® method described in Table 1. However, the automated process time will be increased proportionally and as the Flotac® system is rarely used due to its long processing time, centrifuging requirements and labour-intensive nature of the method. It is suggested that the volume examined in the device and system described herein should represent an increase above the highest level of the most frequently used method, while maintaining minimal process time.

The sensitivity of the test is directly proportional to the volume examined and this volume determines the required number of images to be analysed. The proposed concentration of the suspended buoyant matter at the viewing surface area relative to the volume examined allows the number of images to be transmitted to be kept to a minimum while still maintaining sensitivity. As internet connectivity increases and improves, the device described herein can be optimised to increase the number of image acquisitions and therefore further increasing the sensitivity of the device.

A comparison of coprological examination techniques between the mini-FLOTAC®, McMaster and the system described herein are provided in Table 2 below. Three ovine faecal samples were analysed for the presence of GIT parasites coccidian oocysts, Nematodirus, Strongyles and Strongoloides eggs.

TABLE 2

Trial Report Results

| Sample Ref. No | No. of Eggs detected in 1st McMaster Chamber | No. of Eggs detected in 2nd McMaster Chamber | EPG | No. of Eggs detected in 1st Mini-Flotac ® Chamber | No. of Eggs detected in 2nd Mini-Flotac ® Chamber | EPG | No. of Eggs detected in Invention | EPG |
|---|---|---|---|---|---|---|---|---|
| 68 | 1 | 1 | 66.66 | 4 | 3 | 35.00 | 16 | 72.8 |
| 68 | 0 | 1 | 33.33 | 1 | 2 | 15.00 | 10 | 45.5 |
| 68 | 1 | 0 | 33.33 | 1 | 1 | 10.00 | 12 | 54.6 |
| Mean | | | 44.44 | | | 20.00 | | 57.63 |
| 68 | 0 | 1 | 33.33 | 2 | 3 | 25.00 | 9 | 40.95 |
| 68 | 1 | 0 | 33.33 | 6 | 2 | 40.00 | 9 | 40.95 |
| 68 | 1 | 0 | 33.33 | 0 | 4 | 20.00 | 8 | 36.4 |
| Mean | | | 33.33 | | | 28.33 | | 39.43 |
| 68 | 2 | 1 | 99.99 | 3 | 2 | 25.00 | 5 | 22.75 |
| 68 | 2 | 0 | 66.66 | 2 | 4 | 30.00 | 12 | 54.6 |
| 68 | 0 | 1 | 33.33 | 3 | 3 | 30.00 | 10 | 45.5 |
| 68 | 3 | 2 | 166.65 | 4 | 1 | 25.00 | 12 | 54.6 |
| Mean | | | 91.66 | | | 27.50 | | 44.36 |
| Overall Mean FEC | | | 59.99 | | | 25.50 | | 46.87 |

These results demonstrate that the invention provides an accurate estimation of the true faecal egg count when compared to either the McMaster and Mini-FLOTAC® systems. The importance of the higher volume being analysed is demonstrated by the McMaster results which provide a skewed mean value due to the high extrapolation factor. In this case, the high multiplication factor has resulted in a higher reading but the major downside is that any false negative result has a far greater consequence on the overall analysis. By this we mean that when a very small sample volume is found to be negative for the presence of a parasite, that result is extrapolated to give a negative result for the test as a whole. The distribution of parasite eggs within a sample is not homogenous and therefore, the greater the sample size, the less the variability in the results and the higher the sensitivity.

The availability of testing the sample immediately on site with the suggested automated process will also increase the accuracy of the results as samples, once excreted, deteriorate over time and due to exposure to the environment.

In the specification, the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A cassette (1,200,300) for use in concentrating particulate matter in a sample suspension, the cassette (1,200,300) comprising a housing (2) having a support (5), an inlet port (20) adapted to receive the sample suspension; and an enclosed sample-receiving channel (6) in fluid communication with the inlet port (20), the enclosed sample-receiving channel (6) having an upper portion (7) and a base (5a) connected by at least two walls (11a,11b); in which the upper portion (7) is configured to have a width less than a width of the base (5a) and a depth greater than 400 µm; in which the inlet port (20) is configured to act as a conduit to deliver the sample suspension to the enclosed sample-receiving channel (6); and in which the walls (11a, 11b) of the enclosed sample-receiving channel (6) have a slope of between 40° and less than 90° with respect to the base (5a); characterised in that the enclosed sample-receiving channel (6) further comprises a single raised platform (50) extending upwards from the base (5a) and extending along the length of the enclosed sample-receiving channel (6); in which the raised platform (50) is separated from the upper portion (7) and both of the walls (11a, 11b), and wherein the depth of the upper portion (7) of the enclosed sample-receiving channel (6) is measured from the top of the raised platform (50); wherein the height of the raised platform (50) is greater than or equal to the depth of the enclosed sample-receiving channel (6) measured from the top of the raised platform (50) and wherein the width of the raised platform (50) is greater than or equal to the width of the upper portion (7) of the enclosed sample-receiving channel (6); and wherein the combination of the enclosed sample-receiving channel (6) and the raised platform (50) extending upward from the base (5a) results in a sample concentrating effect on buoyant particulate matter in the sample suspension in the enclosed sample-receiving channel (6).

2. The cassette (1,200,300) according to claim 1, in which the base (5a) is formed by the housing support (5).

3. The cassette (1,200,300) according to claim 1, in which the housing (2) further comprises an air release port (14) in fluid communication with the enclosed sample-receiving channel (6).

4. The cassette (1,200,300) according to claim 3, in which the air release port (14) is diametrically opposed to the inlet port (20) or the air release port (14) is opposite the inlet port (20).

5. The cassette (1,200,300) according to claim 1 or claim 4, in which the inlet port (20) is a non-return valve.

6. The cassette (200) according to claim 1, in which the housing (2) of the cassette (1) consists of a lower section (201) configured to accommodate the enclosed sample-receiving channel (6) and an upper section (202) configured to reversibly attach to and create a seal with the lower section (201).

7. The cassette (1,200,300) according to claim 1, wherein the housing further comprises a hole (30) configured to receive an actuator (101) connected to an image capturing device (100).

8. The cassette (1,200,300) according claim 1, in which the cassette (1,200,300) is configured to move in one plane.

9. The cassette (1,200,300) according to claim 8, wherein the motion within the plane can be rectilinear-translation or rotation, or a combination thereof.

10. The cassette (1,200,300) according claim 1, in which an internal surface of the walls (11*a*, 11*b*) of the enclosed sample-receiving channel (6) is coated with a hydrophobic material or a hydrophilic material to reduce surface tension along the walls of the channel to prevent adhesion of the particulate matter.

11. The cassette (1,200,300) of claim 1, wherein the sample suspension comprises a flotation solution of higher density than the particulate matter in the sample suspension.

12. The cassette (1,200,300) of claim 11, wherein the flotation solution is selected from a saturated NaCl solution, a saturated sugar solution, a Sheather's sugar solution, a saturated zinc sulphate solution, a saturated sodium nitrate solution, or a saturated magnesium sulphate solution.

* * * * *